(12) United States Patent
Tang et al.

(10) Patent No.: US 8,809,466 B2
(45) Date of Patent: Aug. 19, 2014

(54) DEGRADABLE POLYMERS, METHODS OF MAKING THE SAME, AND USES THEREOF

(71) Applicant: The University of South Carolina, Columbia, SC (US)

(72) Inventors: Chuanbing Tang, Columbia, SC (US); Kejian Yao, Columbia, SC (US)

(73) Assignee: The University of South Carolina, Columbia, SC (US)

( * ) Notice: Subject to any disclaimer, the term of this patent is extended or adjusted under 35 U.S.C. 154(b) by 0 days.

(21) Appl. No.: 13/930,001

(22) Filed: Jun. 28, 2013

(65) Prior Publication Data

US 2014/0005341 A1 Jan. 2, 2014

Related U.S. Application Data

(60) Provisional application No. 61/690,521, filed on Jun. 28, 2012, provisional application No. 61/822,594, filed on May 13, 2013.

(51) Int. Cl.
*C08G 63/91* (2006.01)
*C08G 63/08* (2006.01)
*C08G 63/685* (2006.01)
*C08G 65/32* (2006.01)

(52) U.S. Cl.
CPC ............... *C08G 63/91* (2013.01); *C08G 63/08* (2013.01); *C08G 63/6852* (2013.01); *C08G 63/912* (2013.01)
USPC ........................................................ 525/411

(58) Field of Classification Search
USPC .......................................... 525/411; 435/397
See application file for complete search history.

(56) References Cited

U.S. PATENT DOCUMENTS 6,908,966 B2 6/2005 Chang et al.
6,994,865 B2 2/2006 Branham et al.

FOREIGN PATENT DOCUMENTS

EP 0483915 A1 5/1992

OTHER PUBLICATIONS

Martien a. Cohen Stuart, Emerging Applications of Stimuli-responsive Polymer Materials; Martien a. Cohen Stuart, nature materials; vol. 9; Feb. 2010; www.nature.com/naturematerials.*
Alarcon et al., Stimuli responsive polymers for biomedical applications, *Chemical Society Reviews* 2005, 34: 276-285.
Alexander et al., Responsive Polymers at the Biology/Materials Science Interface, *Advanced Materials* 2006, 18: 3321-3328.
Arnal et al., Synthesis and Characterization of Polystyrene-b-poly (ethylene oxide)-*b*-poly(ε-caprolactone) Block Copolymers, *Macromolecules* 2001, 34: 7973-7982.

Azzaroni et al., UCST Wetting Transitions of Polyzwitterionic Brushes Driven by Self-Association, *Angewandte Chemie International Edition* 2006, 45: 1770-1774.
Behrens et al., Structure and Interactions of Charged Triblock Copolymers Studied by Small-Angle X-ray Scattering: Dependence on Temperature and Charge Screening, *Langmuir* 2012, 28: 1105-1114.
Binks et al., Temperature-Induced Inversion of Nanoparticle-Stabilized Emulsions, *Angewandte Chemie International Edition* 2005, 44: 4795-4798.
Bogdanov et al., Synthesis and thermal properties of poly(ethylene glycol)-poly(ε-caprolactone) copolymers, *Polymer* 1998, 39: 1631-1636.
Brahim et al., Synthesis and Hydration Properties of pH-Sensitive p(HEMA)-Based Hydrogels Containing 3-(Trmethoxysilyl)propyl Methacrylate, *Biomacromolecules* 2003, 4: 497-503.
Buss et al., Effect of Soluble Polymer Binder on Particle Distribution in a Drying Particulate Coating, *Journal of Colloid and Interface Science* 2011, 359, 112-120.
Dai et al., pH-Responsive polymers: synthesis, properties and applications, *Soft Matter* 2008 4: 435-449.
Dupin et al., Stimulus-Responsive Liquid Marbles, *Journal of American Chemical Society* 2009, 131: 5386-5387.
Fleming et al., Triazole Cycloaddition as a General Route for Functionalization of Au Nanoparticles, *Chemistry of Materials* 2006, 18: 2327-2334.
Gill et al., Response mechanism of novel polyaniline composite conductimetric pH sensors and the effects of polymer binder, surfactant and film thickness on sensor sensitivity, *European Polymer Journal* 2010, 46: 2042-2050.
Gillies et al., Stimuli-Responsive Supramolecular Assemblies of Linear-Dendritic Copolymers, *Journal of American Chemical Society* 2004, 126: 11936-11943.
Himo et al., Copper(I)-Catalyzed Synthesis of Azoles, DFT Study Predicts Unprecedented Reactivity and Intermediates, *Journal of the American Chemical Society* 2005, 127: 210-216.
Hu et al., Responsive Polymers for Detection and Sensing Applications: Current Status and Future Developments, *Macromolecules* 2010, 43: 8315-8330.
Hua et al., Versatile Strategy for the Synthesis of Dendronlike Polypeptide/Linear Poly(ε-caprolactone) Block Copolymers via Click Chemistry, *Biomacromolecules* 2009, 10: 1140-1148.
Huisgen, Kinetics and Mechanisms of 1,3-Dipolar Cycloadditions, *Angew. Chem. International Edition* 1963, 2(11): 633-645.
Itano et al., Mechanism of the pH-Induced Discontinuous Swelling/Deswelling Transitions of Poly(allylamine hydrochloride)-Containing Polyelectrolyte Multilayer Films, *Macromolecules* 2005, 38: 3450-3460.
Jochum et al., Thermo- and Light-Responsive Polymers Contatining Photoswitachable Azobenzene End Groups, *Macromolecules* 2009, 42: 7854-7862.
Kellum et al., Reversible Interpolyelectrolyte Shell Cross-Linked Micelles from pH/Salt-Responsive Diblock Copolymers Synthesized via RAFT in Aqueous Solution, *Macromolecules* 2010, 43: 7033-7040.

(Continued)

*Primary Examiner* — Terressa Boykin

(74) *Attorney, Agent, or Firm* — Myers, Bigel, Sibley & Sajovec, PA

(57) ABSTRACT

The present invention relates generally to degradable polymers, including degradable polymers that may be responsive to ionic strength. The invention also relates generally to methods of making degradable polymers and methods of using such polymers.

20 Claims, 12 Drawing Sheets

(56) References Cited

OTHER PUBLICATIONS

Lee et al., Stimuli-responsive molecular brushes, *Progress in Polymer Science* 2010, 35: 24-44.
Lenoir et al., Ring-Opening Polymerization of α-Chlor-ε-caprolactone and Chemical Modification of Poly (α-chloro-ε-caprolactone) by Atom Transfer Radical Processes, *Macromolecules* 2004, 4055-4061.
Lewis et al., Click Chemistry in Situ: Acetylcholinesterase as a Reaction Vessel for the Selective Assembly of a Femtomolar Inhibitor from an Array of Building Blocks, *Angewandte Chemie International Edition* 2002, 41(6): 1053-1057.
Li et al., Functionalization of Single-Walled Carbon Nanotubes with Well-Defined Polystyrene by "Click" Coupling, *Journal of the American Chemical Society* 2005, 127: 14518-14524.
Li et al., Stimuli-responsive polymer vesicles, *Soft Matter* 2009, 5: 927-937.
Liu et al., Recent Advances and challenges in designing stimuli-responsive polymers, *Progress in Polymer Science* 2010, 35: 3-23.
Meng et al., Stimuli-Responsive Polymersomes for Programmed Drug Delivery, *Biomacromolecules* 2009, 10(2): 197-209.
Morishima, Thermally Responsive Polymer Vesicles, *Angew Chem. International Edition* 2007, 46: 1370-1372.
Motala-Timol et al., Amphiphilic Poly(L-lysine-*b*-caprolactone) Block Copolymers: Synthesis, Characterization, and Solution Properties, *Macromolecules* 2008, 41: 5571-5576.
Noodleman et al., Quantum Chemical Studies of Intermediates and Reaction Pathways in Selected Enzymes and Catalytic Synthetic Systems, *Chemical Reviews* 2004, 104: 459-508.
Punna et al., Head-to-Tail Peptide Cyclodimerization by Copper-Catalyzed Azide-Alkyne Cycloaddition, *Angewandte Chemie International Edition* 2005, 44: 2215-2220.
Riva et al., Combination of Ring-Opening Polymerization and "Click Chemistry": Toward Functionalization and Grafting of Poly(ε-caprolactone), *Macromolecules* 2007, 40: 796-803.
Rodionov et al., Mechanism of the Ligand-Free Cu-Catalyzed Azide-Alkyne Cycloaddition Reaction, *Angew Chem. International Edition* 2005, 44: 2210-2215.
Sheiko et al., Cylindrical Molecular Brushes: Synthesis, Characterization, and Properties, *Progress Polymer Science* 2008, 33(7): 759-785.
Smith et al., Stimuli-responsive amphiphilic (co)polymers via RAFT polymerization, *Progress in Polymer Science* 2010, 35: 45-93.
Stuart et al., Emerging applications of stimuli-responsive polymer materials, *Nature Materials* 2010, 9: 101-113.
Sumerlin et al., Macromolecular Engineering through Click Chemistry and Other Efficient Transformations, *Macromolecules* 2010 43: 1-13.
Sun et al., Carbohydrate and Protein Immobilization onto Solid Surfaces by Sequential Diels-Alder and Azide-Alkyne Cycloadditions, *Bioconjugate Chemistry* 2006, 17: 52-57.
Sun et al., Synthesis of Amphiphilic Cationic Copolymers Poly[2(methacryloyloxy)ethl Trimethylammonium Chloride-*co*-Stearyl Methacrylate] and Their Self-Assembly Behavior in Water and Water-Ethanol Miztures, *Journal of Polymer Science: Part A: Polymer Chemistry* 2009, 47: 4670-4684.
Tam et al., Polymer Brush-Modified Electrode with Switchable and Tunable Redox Activity for Bioelectronic Applications, *Journal of Physical Chemistry* 2008, 112: 8438-8445.
Tokarev et al., Responsive Polyelectrolyte Gel Membranes, *Advanced Materials* 2006, 18: 2458-2460.
Toomey et al., Swelling Behavior of Thin, Surface-Attached Polymer Networks, *Macromolecules* 2004, 37: 882-887.
Urban et al., Intelligent Polymeric Coatings; Current and Future Advances, *Journal of Macromolecular Science, Part C: Polymer Reviews* 2006, 46(4): 329-339.
Wang et al., Purely Salt-Responsive Micelle Formation and Inversion Based on a Novel Schizophrenic Sulfobetaine Block Copolymer: Structure and Kinetics of Micellization, *Langmuir* 2007, 23: 11866-11874.
Weaver et al., Synthesis and applications of pH-responsive branched copolymer nanoparticles (PRBNs): a comparison with pH-responsive shell cross-linked micelles, *Soft Matter* 2010, 6: 2575-2582.
Wilbon et al., Renewable Rosin Acid-Degradable Caprolactone Block Copolymers by Atom Transfer Radical Polymerization and Ring-Opening Polymerization, *Macromolecules* 2010, 43: 8747-8754.
Yao et al., Cationic Salt-Responsive Bottle-Brush Polymers, *Macromolecular Rapid Communications* 2013, 34: 645-651.
Yao et al., Degradable and salt-responsive random colpolymers, *Polymer Chemistry* 2013, 4: 528-535.

\* cited by examiner

A)

Macromonomer → Bottle-Brush Polymer → Cationic Bottle-Brush Polymer

B)

Chemical Shift (ppm)

A)

B)

C)

DEGRADABLE POLYMERS, METHODS OF MAKING THE SAME, AND USES THEREOF

RELATED APPLICATIONS

This application claims the benefit of and priority from U.S. Provisional Application Ser. Nos. 61/690,521 filed on Jun. 28, 2012 and 61/822,594 filed on May 13, 2013, the disclosures of each of which are hereby incorporated herein by reference in their entirety.

FIELD

The present invention relates generally to degradable polymers, including degradable polymers that may be responsive to ionic strength. The invention also relates generally to methods of making degradable polymers and methods of using such polymers.

BACKGROUND

Stimuli-responsive polymers, which, by definition, have the capability to respond to external or internal stimuli, have drawn attention due to their potential applications in a variety of areas such as drug delivery, tissue engineering and sensors. Stimuli-responsive polymers can be classified into different categories according to their response to pH, temperature, redox-potential, light, etc. Salt-responsive polymers are usually ionic polymers containing charged groups. They can exhibit varied solubility in aqueous solutions depending on the salt concentration.

Salt-responsive copolymers have applications in personal hygiene products such as wet tissues, which usually include a coherent fibrous web and a binder composition. Salt-responsive ionic polymers are considered to be appropriate as binder compositions. The fundamental design is generally as follows: in the wet state with higher salt concentration, the ionic charges of polymers are screened by salts and consequently the polymer chains are insoluble in water, therefore holding the fibrous web together to provide strength. On the other hand, due to electrostatic repulsions, these polymers become soluble in water with a lower salt concentration, and thus can be flushed away. The addition of degradability into these compositions would make them environmentally friendly. Acrylic polymers are widely used as binder compositions. However, most acrylic polymers are not degradable.

The present invention may address previous shortcomings in the art by providing degradable polymers and methods of making and using the same.

SUMMARY OF EMBODIMENTS

A first aspect of the present invention comprises a degradable stimuli-responsive polymer, wherein the polymer is responsive to ionic strength.

A second aspect of the present invention comprises a method for preparing a stimuli-responsive copolymer comprising: co-polymerizing at least two monomers using a ring-opening polymerization to form a copolymer; and attaching a charged moiety to the copolymer using a coupling reaction, thereby preparing the stimuli-responsive copolymer.

A further aspect of the present invention comprises a fibrous article comprising a degradable stimuli-responsive polymer according to embodiments of the present invention.

Another aspect of the present invention comprises a drug delivery device comprising a degradable stimuli-responsive polymer according to embodiments of the present invention.

The foregoing and other aspects of the present invention will now be described in more detail with respect to other embodiments described herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

DETAILED DESCRIPTION OF EMBODIMENTS

Figure 1:
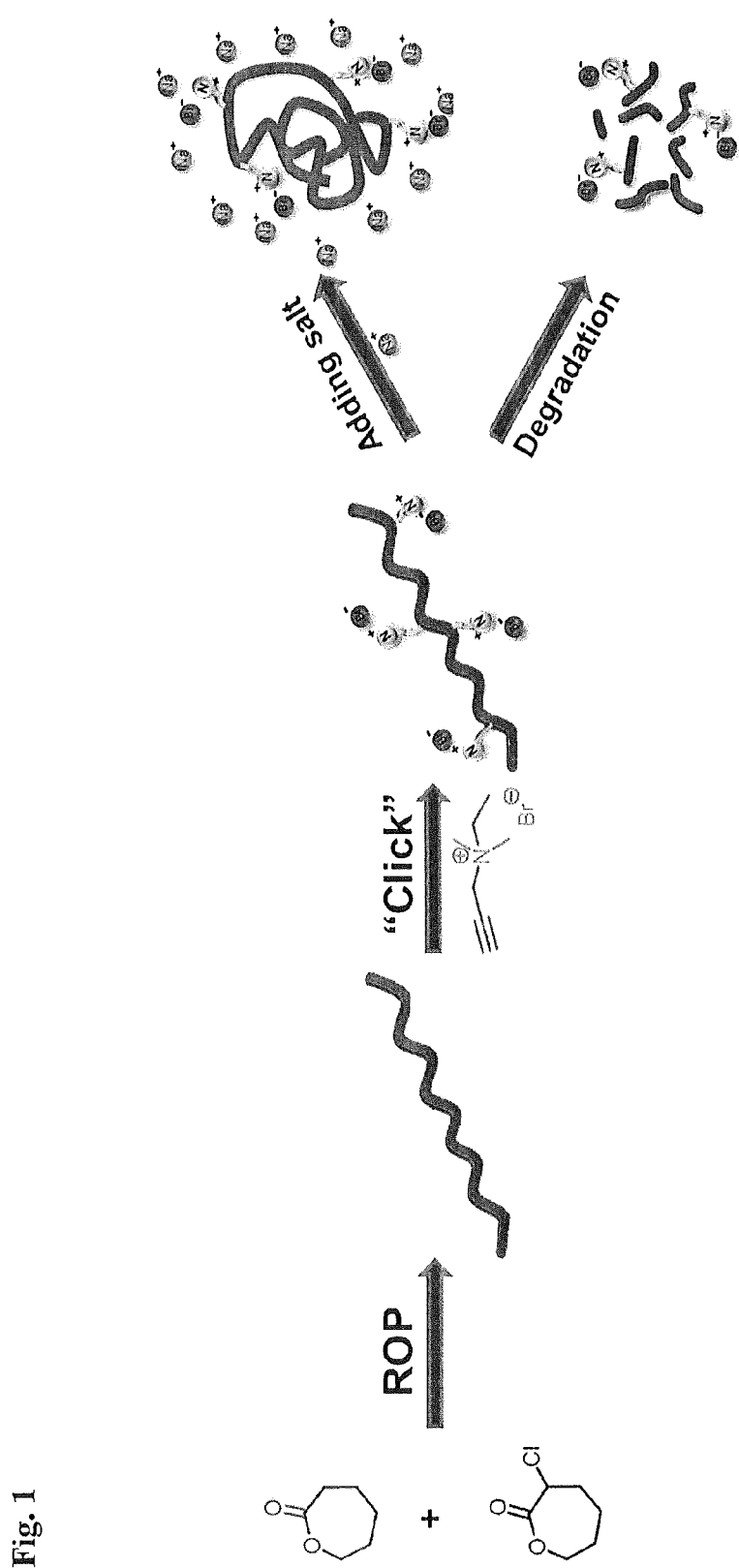
FIG. 1 shows a reaction scheme for preparing a quaternary ammonium (QA)-grafted caprolactone copolymer using ring opening polymerization (ROP) and a click reaction according to embodiments of the invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention. All publications, patent applications, patents and other references mentioned herein are incorporated by reference in their entirety. In case of a conflict in terminology, the present specification is controlling.

Also as used herein, "and/or" refers to and encompasses any and all possible combinations of one or more of the associated listed items, as well as the lack of combinations when interpreted in the alternative ("or").

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a complex comprises components A, B and C, it is specifically intended that any of A, B or C, or a combination thereof, can be omitted and disclaimed.

As used herein, the transitional phrase "consisting essentially of" (and grammatical variants) is to be interpreted as encompassing the recited materials or steps "and those that do not materially affect the basic and novel characteristic(s)" of the claimed invention. See, *In re Herz*, 537 F.2d 549, 551-52, 190 U.S.P.Q. 461, 463 (CCPA 1976) (emphasis in the original); see also MPEP §2111.03. Thus, the term "consisting essentially of" as used herein should not be interpreted as equivalent to "comprising."

The term "about," as used herein when referring to a measurable value such as an amount or concentration and the like, is meant to encompass variations of ±10%, ±5%, ±1%, ±0.5%, or even ±0.1% of the specified value as well as the specified value. For example, "about X" where X is the measurable value, is meant to include X as well as variations of +10%, ±5%, ±1%, ±0.5%, or even ±0.1% of X. A range provided herein for a measurable value may include any other range and/or individual value therein.

"Moiety" or "moieties," as used herein, refer to a portion of a compound, such as a portion of a polymer, typically having a particular functional or structural feature. For example, a moiety may comprise a linking group (a portion of a molecule connecting at least two other portions of the molecule, such as, for example, a unit of a polymer) or a moiety may comprise a side-chain functional group.

"Substituted" as used herein to describe a chemical structure, group, or moiety, refers to the structure, group, or moiety comprising one or more substituents. As used herein, in cases in which a first group is "substituted with" a second group, the second group is attached to the first group whereby a moiety of the first group (typically a hydrogen) is replaced by the second group. The substituted group may contain one or more substituents that may be the same or different.

"Substituent" as used herein references a group that replaces another group in a chemical structure. Typical substituents include nonhydrogen atoms (e.g., halogens), functional groups (such as, but not limited to, amino, sulfhydryl, carbonyl, hydroxyl, alkoxy, carboxyl, silyl, silyloxy, phosphate and the like), hydrocarbyl groups, and hydrocarbyl groups substituted with one or more heteroatoms. Exemplary substituents include, but are not limited to, alkyl, lower alkyl, halo, haloalkyl, alkenyl, alkynyl, cycloalkyl, cycloalkylalkyl, heterocyclo, heterocycloalkyl, aryl, arylalkyl, lower alkoxy, thioalkyl, hydroxyl, thio, mercapto, amino, imino, halo, cyano, nitro, nitroso, azido, carboxy, sulfide, sulfone, sulfoxy, phosphoryl, silyl, silylalkyl, silyloxy, boronyl, and modified lower alkyl.

"Alkyl" as used herein alone or as part of another group, refers to a linear ("straight chain"), branched chain, and/or cyclic hydrocarbon containing from 1 to 30 or more carbon atoms. In some embodiments, the alkyl group may contain 1, 2, or 3 up to 4, 5, 6, 7, 8, 9, 10, 11, 12, 13, 14, 15, 16, 17, 18, 19, 20, 21, 22, 23, 24, 25, 26, 27, 28, 29, or 30 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, and the like. "Lower alkyl" as used herein, is a subset of alkyl and refers to a straight or branched chain hydrocarbon group containing from 1 to 4 carbon atoms. Representative examples of lower alkyl include, but are not limited to, methyl, ethyl, n-propyl, iso-propyl, n-butyl, iso-butyl, tert-butyl, and the like. The term "alkyl" or "loweralkyl" is intended to include both substituted and unsubstituted alkyl or loweralkyl unless otherwise indicated and these groups may be substituted with groups such as, but not limited to, polyalkylene oxides (such as PEG), halo (e.g., haloalkyl), alkyl, haloalkyl, alkenyl, alkynyl, cycloalkyl, cycloalkylalkyl, aryl, arylalkyl, heterocyclo, heterocycloalkyl, hydroxyl, alkoxy (thereby creating a polyalkoxy such as polyethylene glycol), alkenyloxy, alkynyloxy, haloalkoxy, cycloalkoxy, cycloalkylalkyloxy, aryloxy, arylalkyloxy, heterocyclooxy, heterocyclolalkyloxy, mercapto, alkyl-$S(O)_m$, haloalkyl-$S(O)_m$, alkenyl-$S(O)_m$, alkynyl-$S(O)_m$, cycloalkyl-$S(O)_m$, cycloalkylalkyl-$S(O)_m$, aryl-$S(O)_m$, arylalkyl-$S(O)_m$, heterocyclo-$S(O)_m$, heterocycloalkyl-$S(O)_m$, amino, carboxy, alkylamino, alkenylamino, alkynylamino, haloalkylamino, cycloalkylamino, cycloalkylalkylamino, arylamino, arylalkylamino, heterocycloamino, heterocycloalkylamino, disubstituted-amino, acylamino, acyloxy, ester, amide, sulfonamide, urea, alkoxyacylamino, aminoacyloxy, nitro or cyano, where m=0, 1, 2 or 3.

"Alkenyl", as used herein, refers to a straight or branched chain hydrocarbon containing from 2 to 10 or 20 or more carbons, and containing at least one carbon-carbon double bond, formed structurally, for example, by the replacement of two hydrogens. Representative examples of "alkenyl" include, but are not limited to, ethenyl, 2-propenyl, 2-methyl-2-propenyl, 3-butenyl, 4-pentenyl, 5-hexenyl, 2-heptenyl, 2-methyl-1-heptenyl, 3-decenyl and the like. In some embodiments, alkenyl groups as described herein are optionally substituted (e.g., from 1 to 3 or 4 times) with independently selected, but not limited to, H, acyl, alkyl, alkenyl, alkoxy, alkynyl, amidino, amino, amino acid, amide, aryl, azido, carbonate, carbonyl, carboxy, cyano, cycloalkyl, ester, formyl, halo, heterocyclo, heteroaryl, hydroxy, nitro, oxo, oxy, peptide, sulfone, sulfoxide, and thiol.

"Alkynyl", as used herein, refers to a straight or branched chain hydrocarbon group containing from 2 to 10 or 20 or more carbon atoms, and containing at least one carbon-carbon triple bond. Representative examples of alkynyl include, but are not limited, to acetylenyl, 1-propynyl, 2-propynyl, 1-butynyl, 2-butynyl, 2-pentynyl, and the like. In some embodiments, alkynyl groups as described herein are optionally substituted (e.g., from 1 to 3 or 4 times) with independently selected, but not limited to, H, acyl, alkyl, alkenyl, alkoxy, alkynyl, amidino, amino, amino acid, amide, aryl, azido, carbonate, carbonyl, carboxy, cyano, cycloalkyl, ester, formyl, halo, heterocyclo, heteroaryl, hydroxy, nitro, oxo, oxy, peptide, sulfone, sulfoxide, and thiol.

The term "cycloalkyl", as used herein, refers to a saturated or unsaturated cyclic hydrocarbon group containing from 3 to 8 carbons or more. Representative examples of cycloalkyl include cyclopropyl, cyclobutyl, cyclobutenyl, cyclopentyl, cyclohexyl, cycloheptyl, and cyclooctyl. In some embodiments, cycloalkyl groups as described herein are optionally substituted (e.g., from 1 to 3 or 4 times) with independently selected, but not limited to, H, acyl, alkyl, alkenyl, alkoxy, alkynyl, amidino, amino, amino acid, amide, aryl, azido, carbonate, carbonyl, carboxy, cyano, cycloalkyl, ester, formyl, halo, heterocyclo, heteroaryl, hydroxy, nitro, oxo, oxy, peptide, sulfone, sulfoxide, and thiol.

"Heterocyclo", "heterocyclic" and "heterocycle" as used herein, refers to a monocyclic, bicyclic or tricyclic ring system. Monocyclic heterocycle ring systems are exemplified by any 3, 4, 5 or 6 membered ring containing 1, 2, 3, or 4 heteroatoms independently selected from the group consisting of: O, N, and S. The 5 member ring has from 0 to 2 double bonds, and the 6 member ring has from 0-3 double bonds. Representative examples of monocyclic ring systems include, but are not limited to, azetidine, azepine, aziridine, diazepine, 1,3-dioxolane, dioxane, dithiane, furan, imidazole, imidazoline, imidazolidine, isothiazole, isothiazoline, isothiazolidine, isoxazole, isoxazoline, isoxazolidine, morpholine, oxadiazole, oxadiazoline, oxadiazolidine, oxazole, oxazoline, oxazolidine, piperazine, piperidine, pyran, pyrazine, pyrazole, pyrazoline, pyrazolidine, pyridine, pyrimidine, pyridazine, pyrrole, pyrroline, pyrrolidine, tetrahydrofuran, tetrahydrothiophene, tetrazine, tetrazole, thiadiazole, thiadiazoline, thiadiazolidine, thiazole, thiazoline, thiazolidine, thiophene, thiomorpholine, thiomorpholine sulfone, thiomorpholine sulfoxide, thiopyran, triazine, triazole, trithiane, and the like. Bicyclic ring systems are exemplified by any of the above monocyclic ring systems fused to an aryl group as defined herein, a cycloalkyl group as defined herein, or another monocyclic ring system as defined herein. Representative examples of bicyclic ring systems include but are not limited to, for example, benzimidazole, benzothiazole, benzothiadiazole, benzothiophene, benzoxadiazole, benzoxazole, benzofuran, benzopyran, benzothiopyran, benzodioxine, 1,3-benzodioxole, cinnoline, indazole, indole, indoline, indolizine, naphthyridine, isobenzofuran, isobenzothiophene, isoindole, isoindoline, isoquinoline, phthalazine, pyranopyridine, quinoline, quinolizine, quinoxaline, quinazoline, tetrahydroisoquinoline, tetrahydroquinoline, thiopyranopyridine, and the like. In some embodiments, heterocyclo groups as described herein are optionally substituted (e.g., from 1 to 3 or 4 times) with independently selected, but not limited to, H, acyl, alkyl, alkenyl, alkoxy, alkynyl, amidino, amino, amino acid, amide, aryl, azido, carbonate, carbonyl, carboxy, cyano, cycloalkyl, ester, formyl, halo, heterocyclo, heteroaryl, hydroxy, nitro, oxo, oxy, peptide, sulfone, sulfoxide, and thiol.

"Aryl" as used herein refers to a ring system having one or more aromatic rings. Representative examples of aryl include azulenyl, indanyl, indenyl, naphthyl, phenyl, tetrahydronaphthyl, and the like. The aryl groups of this invention can be optionally substituted with 1, 2, 3, 4, 5, 6 or 7 substituents independently selected from, but not limited to, H, acyl, alkyl, alkenyl, alkoxy, alkynyl, amidino, amino, amino acid, amide, aryl, azido, carbonate, carbonyl, carboxy, cyano, cycloalkyl, ester, formyl, halo, heterocyclo, heteroaryl, hydroxy, nitro, oxo, oxy, peptide, sulfone, sulfoxide, and thiol.

"Heteroaryl" means a cyclic, aromatic hydrocarbon in which one or more carbon atoms have been replaced with heteroatoms. If the heteroaryl group contains more than one heteroatom, the heteroatoms may be the same or different. Examples of heteroaryl groups include pyridyl, pyrimidinyl, imidazolyl, thienyl, furyl, pyrazinyl, pyrrolyl, pyranyl, isobenzofuranyl, chromenyl, xanthenyl, indolyl, isoindolyl, indolizinyl, triazolyl, pyridazinyl, indazolyl, purinyl, quinolizinyl, isoquinolinyl, quinolyl, phthalazinyl, naphthyridinyl, quinoxalinyl, isothiazolyl, and benzo[b]thienyl. Preferred heteroaryl groups are five and six membered rings and contain from one to three heteroatoms independently selected from the group consisting of: O, N, and S. The heteroaryl group, including each heteroatom, can be unsubstituted or substituted with from 1 to 4 suitable substituents, as chemically feasible. For example, the heteroatom S may be substituted with one or two oxo groups, which may be shown as =O. In some embodiments, heteroaryl groups as described herein are optionally substituted (e.g., from 1 to 3 or 4 times) with independently selected H, acyl, alkyl, alkenyl, alkoxy, alkynyl, amidino, amino, amino acid, amide, aryl, azido, carbonate, carbonyl, carboxy, cyano, cycloalkyl, ester, formyl, halo, heterocyclo, heteroaryl, hydroxy, nitro, oxo, oxy, peptide, sulfone, sulfoxide, and thiol.

"Alkoxy" as used herein, refers to an alkyl, alkenyl, alkynyl, aryl, cycloalkyl, heterocyclo, or heteroaryl group, as defined herein, appended to the parent molecular moiety through an oxy group. An oxy group as used herein refers to a —O— moiety. Representative examples of alkoxy include, but are not limited to, methoxy, ethoxy, propoxy, phenoxy, 2-propoxy, butoxy, tert-butoxy, pentyloxy, hexyloxy and the like. In some embodiments, alkoxy groups as described herein are optionally substituted (e.g., from 1 to 3 or 5 times) with independently selected groups such as, but not limited to, H, acyl, alkyl, alkenyl, alkoxy, alkynyl, amidino, amino, amino acid, amide, aryl, azido, carbonate, carbonyl, carboxy, cyano, cycloalkyl, ester, formyl, halo, heterocyclo, heteroaryl, hydroxy, nitro, oxo, oxy, peptide, sulfone, sulfoxide, and thiol.

Embodiments of the present invention are directed to degradable polymers, particularly degradable stimuli-responsive polymers, and compositions comprising the same. The polymer may comprise a copolymer, such as a block copolymer, random copolymer, star copolymer, and/or graft copolymer; a bottle-brush polymer; and any combination thereof. In some embodiments, a degradable stimuli-responsive polymer may be responsive to ionic strength. The degradable stimuli-responsive polymer may be responsive to ionic strength and/or configured to be responsive to ionic strength, optionally by comprising at least one unit that is responsive to ionic strength. The polymer may be a cationic polymer. In certain embodiments, the polymer may be a degradable, salt-responsive, water-dispersible, and/or cationic polymer.

"Degradable," as used herein in reference to a polymer and/or composition of the present invention, refers to a polymer and/or composition that breaks down into two or more components and/or to a polymer and/or composition that loses its structural integrity and/or strength in response to an external stimulus and/or after a particular period of time. A polymer and/or composition of the present invention may degrade when in the presence of an external stimulus and/or after a period of time in contact with an external stimulus. The polymer and/or composition may be degraded, for example, by an acid, a base, a microorganism (e.g., bacteria), a biological material (e.g., a material from a plant and/or animal, such as an enzyme), and any combination thereof. In some embodiments, the polymer and/or composition may be biodegradable (i.e., can be degraded by a microorganism and/or biological material). A polymer and/or composition of the present invention may be 100% biodegradable (i.e., a microorganism and/or biological material may be able to break apart each unit in the polymer) or a portion of the polymer and/or composition may be biodegradable.

A polymer of the present invention may be responsive to ionic strength. For example, a polymer may be responsive to the concentration of an ion (e.g., a monovalent and/or divalent ion). The ion may be an ion present in a solution, such as, but not limited to, a salt solution. Thus, in some embodiments, the polymer may be responsive to the ionic strength of a salt solution. Exemplary salts include organic salts and/or inorganic salts and their respective ions. For example, a polymer may be responsive to a salt such as, but not limited to, NaCl, NaBr, KCl, $NH_4Cl$, $Na_2SO_4$, $ZnCl_2$, $CaCl_2$, $MgCl_2$, $MgSO_4$, $NaNO_3$, $NaCH_3OSO_3$, and any combination thereof. Exemplary ions include, but are not limited to, $Na^+$ ions, $K^+$ ions, $Li^+$ ions, $NH_4^+$ ions, $Zn^{2+}$ ions, $Ca^{2+}$ ions, $Mg^{2+}$ ions, quaternary ammonium ions such as, e.g., $N^+R^1R^2R^3R^4$ wherein $R^1$, $R^2$, $R^3$, and $R^4$ each independently comprise a $C_{1-4}$ alkyl group or two of $R^1$, $R^2$, $R^3$, and $R^4$ may together with the nitrogen atom form a heterocycle having 1-4 carbon atoms, and any combination thereof.

One or more chemical and/or physical properties of a polymer of the present invention may change in response to ionic strength. In the presence of low ionic strength, a polymer of the present invention may be soluble and as the ionic strength increases the solubility of the polymer may decrease. Thus, the solubility of a polymer of the present invention in a solution may be dependent on the ionic strength of the solution. In some embodiments, a polymer of the present invention may become increasingly insoluble as an aqueous salt solution approaches a salt concentration of 0.05 M or greater. In the presence of low ionic strength, the polymer may be soluble due to the domination of electrostatic repulsive Coulomb interactions between a charged moiety present in the polymer, such as, but not limited to, a cationic quaternary ammonium ion, over to the hydrophobic interactions between the polymeric units, such as, but not limited to, caprolactone units and/or derivatives thereof. The solubility of the polymer may decrease as ionic strength increases due to the screening effect of free ions to reduce the repulsive Coulomb interactions, which may cause a change in the macromolecular conformation of the polymer. An exemplary scheme showing a change in macromolecular conformation of a polymer of the present invention is depicted in FIG. 1.

According to some embodiments, a polymer of the present invention may solubilize in the presence of an ion concentration of 2000 ppm or less. In some embodiments, a polymer of the present invention may be configured to solubilize in the presence of an ion concentration of 2000 ppm or less. In certain embodiments, the polymer may solubilize in the presence of a cation concentration of 2000 ppm or less.

"Solubilize," as used herein, refers to the ability of the polymer to disperse and/or dissolve in a solution. Unless indicated to the contrary, a "solution" as used herein may comprise an aqueous solution and/or an organic solvent. In some embodiments, a solution may comprise a salt.

In certain embodiments, a polymer of the present invention may solubilize in the presence of a salt concentration of less than about 0.05 M. The polymer may be configured to solubilize in the presence of a salt concentration of less than about 0.05 M. The salt may be dissolved in an aqueous solution. In some embodiments, the polymer may be substantially insoluble in an aqueous salt solution having a salt concentration of 0.05 M or greater. "Substantially insoluble" as used herein, refers to a polymer of the present invention and/or composition comprising a polymer of the present invention that, after being in contact with a solution for one day, has a light transmittance of less than about 50%, in some embodiments less than about 30%, in further embodiments less than about 15%, and in still further embodiments less than about 10%. In certain embodiments, a substantially insoluble polymer of the present invention and/or composition comprising a polymer of the present invention may have less than about 10% of the polymer and/or composition dissolved and/or dissociated in a solution after being in contact with the solution for 1 day.

The solubility of a polymer of the present invention and/or a composition comprising a polymer of the present invention in a solution may be determined by the visual appearance of the solution, by determining the amount of light transmitted through the solution, and/or by measuring the optical turbidity of the solution. For example, when a solution having a particular ionic strength and comprising a polymer is transparent, this may indicate that the polymer is soluble in that solution, and as the transparency of the solution decreases (i.e., the solution becomes opaque), it may indicate that the polymer is less soluble in the solution and/or insoluble in the solution. In some embodiments, the solubility of a polymer may be determined by measuring the amount of light transmitted though a solution comprising the polymer and/or the optical turbidity of the solution using UV/vis spectrometry. Atomic force microscopy (AFM) may be used to determine the solubility and/or responsiveness of the polymer in the presence of a particular ionic strength based on the macromolecular conformation and/or morphology of the polymer.

A polymer of the present invention and/or a composition comprising the polymer may have a particular strength when the polymer and/or composition is wet or in contact with a solution. "Wet" as used herein refers to a polymer and/or composition comprising the polymer being partially or fully hydrated with a solution. In some embodiments, the polymer and/or composition comprising the polymer may have a tensile strength of less than 30 grams per inch when the polymer and/or composition is in contact with a solution having a ion concentration of 2000 ppm or less and/or an ionic strength of less than about 0.05 M. The term "contact" as used herein, refers to soaking, suspending, immersing, saturating, dipping, dousing, wetting, rinsing, washing, submerging, immersing, spraying, and/or any variation and/or combination thereof, the polymer and/or composition in and/or with a solution.

A polymer of the present invention may comprise at least one unit. The unit may be degradable and optionally biodegradable. "Unit" as used herein, refers to a segment of the polymer. A "unit" may be repeated and/or present in the polymer two or more times. A "unit" may be formed by polymerizing a monomer, and thus the unit may comprise the monomer and/or a derivative thereof. Exemplary units include, but are not limited to, caprolactone, lactic acid, glycolic acid, hydroxyalkanoic acid, hydroxybutyric acid, hydroxyvaleric acid, trimethylene carbonate, dicarboxylic acid anhydrides, butylene succinate, butylene adipate, abietic acid, levopimaric acid, hydroabietic acid, pimaric acid, norbornene, derivatives thereof, and any combination thereof. Units include all stereoisomers (e.g., enantiomers and diastereoisomers). "Derivatives thereof," "derivative of a monomer," and grammatical variations thereof as used herein, refer to a moiety derived from a monomer or compound. A derivative of a monomer or compound may be formed as a result of a step in the process for preparing the polymer. For example, for caprolactone, a derivative thereof includes, but is not limited to, the moiety having the chemical structure —C(O)—(CH$_2$)$_5$—O—. In some embodiments, a polymer of the present invention comprises a polyester segment.

"Polyester segment" as used herein refers to the moiety —R—C(O)—O—R'—, wherein R and R' are each independently an alkyl, alkylene, alkyne, cycloalkyl, aryl group, and any combination thereof. In certain embodiments, a polymer of the present invention may comprise two repeating units, wherein the units comprise caprolactone and/or a derivative thereof, such as, but not limited to, —C(O)—(CH$_2$)$_5$—O—.

"Hydroxyalkanoic acid" as used herein refers to a class of chemical compounds that comprise a carboxylic acid and a hydroxyl group. Exemplary hydroxyalkanoic acids include, but are not limited to, (R)-lactic acid, (S)-lactic acid, (R)-2-hydroxybutyric acid, (S)-2-hydroxybutyric acid, (R)-3-hydroxybutyric acid, (S)-3-hydroxybutyric acid, 4-hydroxybutyric acid, and 3-hydroxypentanoic acid. In some embodiments, a hydroxyalkanoic acid has the following chemical structure:

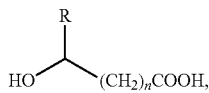

wherein n=0 to 20; R is H, C$_1$-C$_{20}$ alkyl, C$_1$-C$_{20}$ alkenyl, C$_1$-C20 alkynyl, aryl or heteroaryl.

"Dicarboxylic acid anhydride" and "anhydride" as used herein refer to a compound that is formed when two carboxylic acids are reacted to lose one mole of water. Exemplary dicarboxylic acid anhydrides include, but are not limited to, acetic acid anhydride, benzoic acid anhydride, maleic acid anhydride, succinic acid anhydride, phthalic acid anhydride, di-, tetra- and hexa-hydrophthalic acid anhydride, trimellitic acid anhydride and itaconic acid anhydride.

A polymer of the present invention may comprise at least one charged moiety. In some embodiments, the charged moiety may comprise a cationic moiety. Exemplary charged moieties include, but are not limited to, quaternary ammonium moieties such as those containing alkyl, alkylene, alkyne, cycloalkyl, aryl, and/or heterocycle functional groups; pyridinium moieties; phosphonium moieties; derivatives thereof, and any combination thereof. The at least one charged moiety may be attached to at least one unit of a polymer of the present invention. In certain embodiments, the at least one charged moiety, such as, but not limited to, a cationic moiety, is attached as a side chain functional group of a unit in a polymer of the present invention. In some embodiments, a polymer of the present invention comprises a quaternary ammonium moiety.

According to some embodiments of the present invention, a polymer may comprise a first unit and a second unit, wherein the second unit comprises a charged moiety, such as, but not limited to a cationic moiety. The first unit and/or second unit may be degradable, optionally biodegradable. The unit comprising the charged moiety (i.e., the charged unit) may be present in the polymer in a range of about 5 mol % to about 40 mol % or any range and/or individual value there, such as, but not limited to, about 5 mol % to about 25 mol %, about 10 mol % to about 20 mol %, or about 10 mol % to about 30 mol %. In certain embodiments, the charged unit may be present in the polymer in an amount of about 15 mol %.

A polymer of the present invention may have a molecular weight in a range of about 5,000 g/mol to about 5,000,000 g/mol or any range and/or individual value therein, such as, but not limited to about 5,000 g/mol to about 1,500,000 g/mol, about 10,000 g/mol to about 3,000,000 g/mol, or about 2,000,000 g/mol to about 5,000,000 g/mol. In some embodiments, a polymer of the present invention comprises at least one unit comprising a caprolactone derivative and a quaternary ammonium moiety. The molecular weight of the polymer and/or the composition of the polymer may be controlled and/or tuned to a desired molecular weight.

In some embodiments, a polymer of the present invention comprises a polymer of formula (I) having the chemical structure:

$$A\text{-}B_n\text{-}C_m\text{-}D \qquad (I),$$

wherein

A and D are each independently hydrogen; alkyl; alkenyl; alkynyl; alkoxy; aryl; carboxy; hydroxy; heterocyclo; heteroaryl; or a unit selected from the group consisting of caprolactone, lactide, lactic acid, glycolic acid, hydroxyalkanoic acid, hydroxybutyric acid, hydroxyvaleric acid, trimethylene carbonate, dicarboxylic acid anhydrides, butylene succinate, butylene adipate, abietic acid, levopimaric acid, hydroabietic acid, pimaric acid, norbornene, or a derivative thereof;

B and C are each independently a unit selected from the group consisting of caprolactone, lactic acid, glycolic acid, hydroxyalkanoic acid, hydroxybutyric acid, hydroxyvaleric acid, trimethylene carbonate, dicarboxylic acid anhydrides, butylene succinate, butylene adipate, abietic acid, levopimaric acid, hydroabietic acid, pimaric acid, norbornene, or a derivative thereof; and n and m are each independently a number selected from 2 to 1,000,000; and wherein at least one of B and C comprise a charged moiety selected from the group consisting of a quaternary ammonium moiety, a pyridinium moiety, a phosphonium moiety, and any combination thereof. In some embodiments, A and D are each independently hydrogen; C$_{1-4}$ alkyl; C$_{1-4}$ alkoxy; or a unit selected from the group consisting of caprolactone, lactide, lactic acid, glycolic acid, hydroxyalkanoic acid, hydroxybutyric acid, hydroxyvaleric acid, trimethylene carbonate, dicarboxylic acid anhydrides, butylene succinate, butylene adipate, abietic acid, levopimaric acid, hydroabietic acid, pimaric acid, norbornene, or a derivative thereof.

According to some embodiments, a composition comprising a polymer of the present invention may be provided. A polymer of the present invention may be used as a binder composition, such as, but not limited to, a binder composition for disposable products, or a binder composition may comprise a polymer of the present invention. Exemplary disposable products include, but are not limited to, water-dispersible products. A composition of the present invention may be used alone or combined with one or more components or additives. For example, a composition of the present invention may be used as a binder composition and/or to prepare a water-dispersible product. Exemplary components or additives for use with a binder composition and methods for preparing water-dispersible products are described in U.S. Pat. No. 6,994,865, which is incorporated herein by reference in its entirety for the teachings relevant to this paragraph in which the reference is discussed.

A method for preparing a polymer of the present invention may be provided according to embodiments of the invention.

The method may comprise co-polymerizing at least two monomers or compounds using a ring-opening polymerization to form a copolymer; and attaching a charged moiety to the copolymer using a coupling reaction, thereby preparing the polymer. Exemplary monomers or compounds include, but are not limited to, caprolactone, lactide, lactic acid, glycolic acid, hydroxyalkanoic acid, hydroxybutyric acid, hydroxyvaleric acid, trimethylene carbonate, dicarboxylic acid anhydrides, butylene succinate, butylene adipate, abietic acid, levopimaric acid, hydroabietic acid, pimaric acid, norbornene, and any combination thereof. Monomers include all stereoisomers (e.g., enantiomers and diastereoisomers). The charged moiety may comprise a quaternary ammonium moiety, a pyridinium moiety, a phosphonium moiety, and any combination thereof.

The coupling reaction may be a click chemistry reaction, an esterification reaction, an imidization reaction, and any combination thereof. In some embodiments, the coupling reaction may be a click chemistry reaction, such as, but not limited to, a copper-catalyzed Huisgen-cyclo addition reaction.

A "click chemistry reaction" as used herein refers to a reaction that may provide one or more of the following features: be modular, give a high chemical yield, generate only inoffensive byproducts, be stereospecific, favor a reaction with a single reaction product, use no solvent or use a solvent that is benign or easily removed (preferably water), and/or provide simple product isolation by non-chromatographic methods.

Click chemistry reactions are known to those of ordinary skill in the art and include, but are not limited to addition reactions, cycloaddition reactions, radical-mediated reactions, and nucleophilic substitutions. Exemplary cycloaddition reactions include, but are not limited to, Huisgen 1,3-dipolar cycloadditions, copper catalyzed azide-alkyne cycloadditions, and Diels-Alder reactions. Exemplary addition reactions include, but are not limited to, addition reactions to carbon-carbon double bonds such as epoxidation and dihydroxylation. Exemplary radical-mediated reactions include, but are not limited to, thiol-ene and thiol-yne radical reactions. Exemplary nucleophilic substitution reactions include, but are not limited to, nucleophilic substitution to strained rings such as epoxy and aziridine compounds, thiol-epoxy reactions, thiol-isocyanate reactions, and thiol-Michael addition reactions. A description of click chemistry can be found in Huisgen, Angew. Chem. Int. Ed., Vol. 2, No. 11, 1963, pp. 633-696; Lewis et al., Angew. Chem. Int. Ed., Vol. 41, No. 6, 2002, pp. 1053-1057; Rodionov et al., Angew. Chem. Int. Ed., Vol. 44, 2005, pp. 2210-2215; Punna et al., Angew. Chem. Int. Ed., Vol. 44, 2005, pp. 2215-2220; Li et al., J. Am. Chem. Soc., Vol. 127, 2005, pp. 14518-14524; Himo et al., J. Am. Chem. Soc., Vol. 127, 2005, pp. 210-216; Noodleman et al., Chem. Rev., Vol. 104, 2004, pp. 459-508; Sun et al., Bioconjugate Chem., Vol. 17, 2006, pp. 52-57; and Fleming et al., Chem. Mater., Vol. 18, 2006, pp. 2327-2334, the contents of each of which are incorporated by reference herein in their entireties for the teachings relevant to this paragraph in which the references are discussed.

The ring-opening polymerization reaction may be carried out at a temperature in a range of about 50° C. to about 150° C. or any range and/or individual value therein such as, but not limited to, about 75° C. to about 150° C. or about 100° C. to about 130° C. The coupling reaction may be carried out at a temperature in a range of about 5° C. to about 50° C. or any range and/or individual value therein such as, but not limited to, about 15° C. to about 40° C. or about 20° C. to about 30° C.

A method of the present invention may further comprise polymerizing the copolymer using a ring-opening polymerization or a step-growth polymerization. This additional polymerization reaction may provide a bottle-brush polymer. In some embodiments, the method further comprises a ring-opening metathesis polymerization, such as, but not limited to, a ring-opening metathesis polymerization that is carried out with a Grubbs III catalyst.

In some embodiments, methods are provided for preparing salt-responsive, degradable cationic polymers, wherein the polymer comprises a random copolymer, block copolymer, graft copolymer, and/or star copolymer and the polymer comprises at least one unit comprising a cationic moiety. The cationic moiety may be incorporated into the polymer by post-polymerization modification.

A polymer of the present invention may comprise a salt-responsive, biodegradable cationic, random copolymer, such as, but not limited to, poly($\epsilon$-caprolactone)-co-poly($\epsilon$-caprolactone-graft-quaternary ammonium) (PCL-co-P(CL-g-QA)). The random copolymer may have a molecular weight in the range about 10,000-500,000 g/mole and may be 100% biodegradable. The random copolymer may be prepared by a combination of ring-opening polymerization (ROP) and click chemistry.

Figure 2:
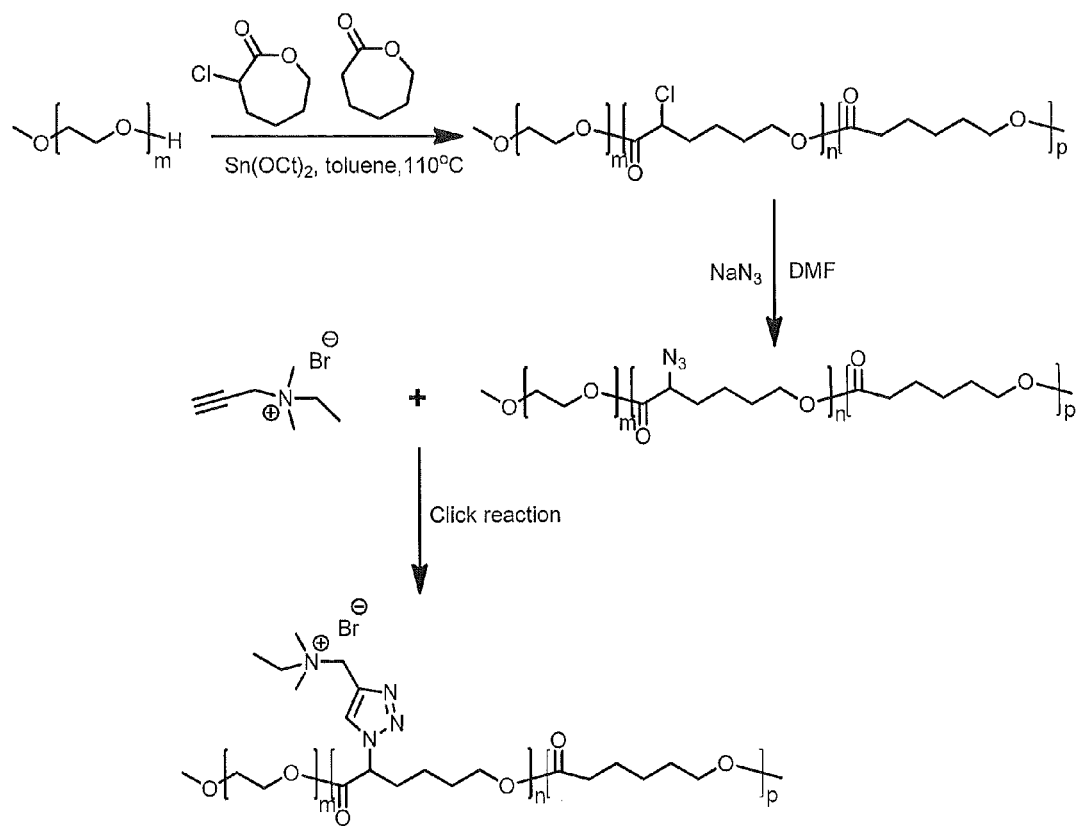
FIG. 2 shows a reaction scheme for preparing a QA-grafted caprolactone block copolymer using ROP and a click reaction according to embodiments of the invention.

A polymer of the present invention may comprise a salt-responsive biodegradable cationic block copolymer, such as, but not limited to, poly(ethylene oxide)-block-poly(s-caprolactone)-co-poly(g-caprolactone-graft-quaternary ammonium) (PEO-b-(PCL-co-P (CL-g-QA))). The PCL part of the polymer may be biodegradable. The block copolymer may have a molecular weight in the range about 10,000-500,000 g/mole and may be prepared by a combination of ROP and click chemistry. FIG. 2 illustrates a reaction scheme according to embodiments of the present invention for preparing a quaternary ammonium-grafted caprolactone block copolymer.

Figure 3:
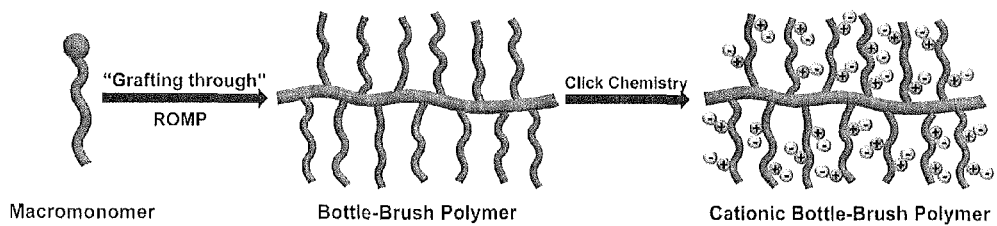
FIG. 3A shows a reaction scheme for preparing a cationic bottle-brush polymer using ring-opening metathesis polymerization (ROMP), ROP and click chemistry according to embodiments of the invention.
FIG. 3B shows a reaction scheme for preparing a PNPH-g-(PCL-co-P(CL-g-QA)) molecular brush using ring-opening metathesis polymerization (ROMP), ROP and click chemistry according to embodiments of the invention.
Figure 3:
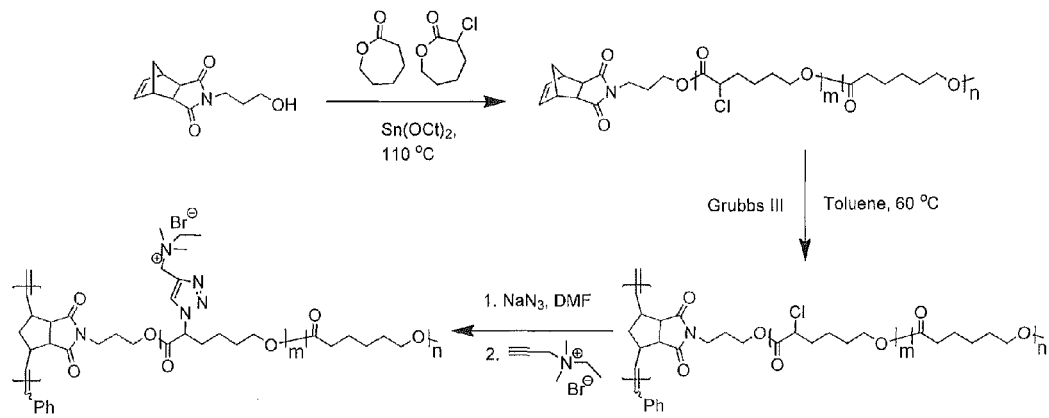

A polymer of the present invention may comprise a salt-responsive biodegradable graft copolymer, such as, but not limited to, poly(N-[3-hydroxylpropyl]-cis-5-norbornene-exo-2,3-dicarboximide)-graft-poly($\epsilon$-caprolactone)-co-poly ($\epsilon$-caprolactone-graft-quaternary ammonium) (PNPH-graft-(PCL-co-P(CL-g-QA))). The PCL part of the polymer may be biodegradable. The graft copolymers may be prepared by a combination of, ring-opening metathesis polymerization (ROMP), ROP, and click chemistry and may have a molecular weight in the range of about 10,000-1,000,000 g/mole. FIGS. 3A and 3B illustrate reaction schemes according to embodiments of the present invention for preparing a quaternary ammonium-grafted caprolactone graft copolymer by ROMP, ROP, and click reaction.

A polymer and/or method of the present invention may have and/or provide for one or more of the following features: 1) the backbone components of the polymer may be integrated as degradable units, 2) the side-chain components of the polymer may be integrated as degradable units, 3) the degradable units may comprise charged moieties, such as, but not limited to, cationic moieties, 4) a salt-responsive cationic copolymer may be used for preparing a degradable random copolymer, which may have one or more degradable units, 5) a salt-responsive degradable cationic copolymer for star copolymers may be provided, 6) a salt-responsive degradable cationic copolymer for grafted copolymers may be provided, and 7) a salt-responsive degradable cationic copolymer may have various applications such as in personal-care products. In some embodiments, the properties of a polymer of the present invention, such as, but not limited to, a salt-responsive degradable cationic copolymer, may be tuned by changing the molecular weight of the polymer, the composition of the polymer, and/or the chemical structure of each segment or unit in the polymer.

In some embodiments, a polymer of the present invention may be prepared by a method comprising a ring-opening polymerization (ROP) and a click chemistry reaction. Compared to other salt-responsive polymers, a polymer of the present invention may have a number of distinct advantages. For example, in a polymer of the present invention, a salt-responsive unit may be randomly distributed along the polymer chain instead of as an entire continuous segment, and thus may provide a different molecular conformation when interacting with salts. In addition, the polymer may comprise a polyester segment or skeleton which may render it degradable, whereas most other salt-responsive polymers are non-degradable. The biodegradability of a polymer may enable the polymer to be used in many applications, particularly those in the biomedical field. For example, polycaprolactone may be degraded under acidic condition and/or biological conditions, such as those using microorganisms and/or biological materials.

A fibrous article comprising a polymer of the present invention may be provided according to embodiments of the present invention. Exemplary fibrous articles include, but are not limited to, papers, multifilament fibers, nonwoven webs, textile yarns, personal care products, health care products, medical and surgical care products, laminates, fiber-containing cleaning products, replacement inserts for personal hygiene and cleaning products, packaging materials, personal protection products, laminating adhesives, protective layers, binders, and any combination thereof. When dry or when in contact with a solution having an ion concentration of 2000 ppm or less and/or an ionic strength of less than about 0.05 M, the fibrous article may maintain its strength and/or structural integrity as compared to the fibrous article when wet or when in contact with a solution having an ion concentration of greater than 2000 ppm and/or an ionic strength of greater than 0.05 M. "Dry" as used herein means the polymer, composition, and/or article (e.g., a fibrous article) has a moisture content of less than about 5% by weight of the polymer, composition, and/or article. The strength and/or structural integrity of the article may be determined by determining the amount of dissociation and/or dissolution of the polymer into the solution. In some embodiments, a fibrous article may maintain its strength and/or structural integrity by being substantially insoluble in the solution. In some embodiments, a fibrous article may maintain its strength in that the strength of the article is within ±20% of the strength of the article in a dry state or in a solution in which the article is substantially insoluble.

In some embodiments, a personal care product comprising a polymer of the present invention may be provided according to embodiments of the present invention. The personal care product may be a water-dispersible personal care product such as, but not limited to, a wet wipe. In some embodiments, a wet wipe may comprise a polymer of the present invention and may be flushable. Exemplary fibrous articles and personal care products, components for use therein, and their methods of making are described in U.S. Pat. No. 6,994,865, which is incorporated herein by reference in its entirety for the teachings relevant to this paragraph in which the reference is discussed.

According to some embodiments, a drug delivery device comprising a polymer of the present invention may be provided. The polymer may entrap and/or bind to an active agent in and/or on the device. The active agent may be present in the device in a concentration of about 0.1% to about 50% by weight of the dry device or any range therein, such as, but not limited to, about 1% to about 25%, about 5% to about 40%, or about 0.1% to about 15% by weight of the dry device.

The present invention is explained in greater detail in the following non-limiting Examples.

EXAMPLES

Example 1

A salt-responsive degradable cationic random copolymer containing polycaprolactone was prepared. The reaction is shown in part in FIG. 1. 1-Bromoethane was dissolved in tetrahydrofuran (THF) in a round bottom flask, followed by the addition of 3-dimethylamino-1-propyne. The mixture was stirred at 35° C. for 2 days. Then the solvent and excess bromoethane were evaporated in vacuo. The mixture was washed with diethyl ether several times to remove the unreacted 3-dimethylamion-1-propyne. The salt was finally dried in vacuum.

The random copolymerization was carried out at 120° C. in toluene. α-Chloro-ε-caprolactone (αClεCL) and ε-caprolactone (εCL) were dried by azeotropic distillation of toluene before polymerization. 4-tert-Butylbenzyl alcohol and Sn(II) 2-ethylhexanoate (Sn(OCt)$_2$) were successively added into a schlenk flask. The flask was tightly sealed and purged with nitrogen for 10 minutes. The two monomers with specific ratio were dissolved in 1 mL dry toluene in a small round bottom flask and the flask was also purged with nitrogen for about 10 minutes, then the monomer solution was transferred to the schlenk flask under the nitrogen protection through a syringe. The reaction flask was then put into a preheated oil bath at 120° C. for 12 hours. After the polymerization, the solution was diluted with dichloromethane and then precipitated in cold methanol, yielding random copolymer poly (αClεCL-co-εCL).

Poly(αClεCL-co-εCL) (1 equivalent of αClεCL) was dissolved in DMF in a round bottom flask, 1 equivalent of NaN$_3$ was then added and the mixture was stirred at room temperature overnight. After the reaction, the DMF was evaporated under reduced pressure and then toluene was added. The insoluble salt was removed by centrifugation (5000 rpm at 25° C. for 15 min). Finally the copolymer was recovered by evaporation of the solvent in vacuo, yielding random copolymer poly(αN$_3$εCL-co-εCL).

Poly(αN3εCL-co-εCL) (1 equivalent of αN3εCL) and ammonium bromide (1 equivalent) were added into a round bottom flask containing 50/50 (v/v) THF/DMF mixture solvent. 0.1 equivalent of DBU and CuI were then added, and the reaction mixture was stirred at 35° C. for 4 h. After the reaction, the copolymer was precipitated in diethyl ether and dried in vacuo. Then the copolymers were dialyzed against deionized water for several hours to remove the remaining small molecules. The copolymers were finally recovered by freeze-drying, yielding random copolymer of caprolactone and quaternary ammonium-substituted caprolactone (PCL-co-P(CL-g-QA)).

Example 2

A salt-responsive degradable cationic random copolymer containing polylactide was prepared. The copolymerization was carried out at 110° C. in toluene. αClεCL was dried by azeotropic distillation of toluene and L-lactide was recrystallized in ethyl acetate before polymerization. 4-tert-Butylbenzyl alcohol and Sn(OCt)$_2$ were successively added into a schlenk flask. The flask was tightly sealed and purged with nitrogen for 10 minutes. Then the two monomers with predetermined ratios were dissolved in 1 mL dry toluene in a small round bottom flask and the flask was also purged with nitrogen for about 10 min under heating at 70° C. (to make sure the lactide was well dissolved). Then the monomer solution was transferred to the schlenk flask under the nitrogen protection through a syringe. The reaction flask was then put into a preheated oil bath at 110° C. for 48 hours. After the polymerization, the solution was diluted with dichloromethane and then precipitated in hexane, yielding random copolymer PLA-co-P(αClεCL).

PLA-co-P(αClεCL) (1 equivalent αClεCL) was dissolved in DMF in a round bottom flask with stir bar equipped, 5 equivalent NaN$_3$ was then added and the mixture was stirred at room temperature overnight. After the reaction, the solid was filtered and the DMF was evaporated under reduced pressure. After adding methylene chloride into the mixture, the insoluble salt was removed by centrifugation (5000 rpm at 25° C. for 15 min). Finally the copolymer was recovered by evaporation of the solvent in vacuo, yielding random copolymer PLA-co-P(αN$_3$εCL).

PLA-co-P(αN$_3$εCL) (1 equivalent αN$_3$εCL) and ammonium bromide (1.2 equivalent) were added into a round bottom flask containing 50/50 (v/v) THF/DMF mixture solvent. 0.1 equivalent of DBU and CuI were then added, and the reaction mixture was stirred at 35° C. for 4 h. After the reaction, the copolymer was precipitated in cold diethyl ether and dry in vacuo. Then the copolymers were dissolved in water and dialyzed against deionized water for several hours to remove the remaining small molecules. The final copolymers were recovered by freeze-drying, yielding random copolymer of lactide and quaternary ammonium-substituted caprolactone (PLA-co-P(CL-g-QA)).

Example 3

A salt-responsive degradable cationic block copolymer containing polycaprolactone was prepared as shown in FIG. 2. The polymerization was carried out in toluene with PEG-OH (M$_n$=5,000 g/mol) as macroinitiator and Sn(Oct)$_2$ as catalyst. PEG-OH and catalyst were first dissolved in 1 mL dry toluene in a schlenk flask and purged with nitrogen for 10 minutes. In order to make the PEG well dissolved in toluene, the schlenk flask was heated at 60° C. during the purging process. Monomers ECL and αClεCL with predetermined ratios were dissolved in another small round bottom flask as well as catalyst with 1 mL toluene and purged with nitrogen for 10 minutes. Then the monomer solution was transferred to the schlenk flask with a syringe under nitrogen atmosphere. The reaction flask was finally put into a preheated oil bath at 110° C. for 24 hours. After the polymerization, the solution was diluted with dichloromethane and then precipitated in cold diethyl ether, yielding block copolymer of ethylene glycol and (εCL/αClεCL) (PEG-b-(PCL-co-P(αClεCL))).

PEG-b-(PCL-co-P(αClεCL) (1 equivalent αClεCL) was dissolved in DMF in a round bottom flask with a stirring bar. 5 equivalent NaN$_3$ was then added and the mixture was stirred at room temperature overnight. After the reaction, the solid was filtered and the DMF was evaporated under reduced pressure. Then the mixture was dissolved in toluene and the insoluble solid was removed by centrifugation (5000 rpm at 25° C. for 15 min). Finally the copolymer was recovered by evaporation of the solvent in vacuo, yielding block copolymer of ethylene glycol and (εCL/αN$_3$εCL) (PEG-b-(PCL-co-P(αN$_3$εCL))).

The click reaction procedure was similar to the preparation of random copolymer PLA-co-P(CL-g-QA). PEG-b-(PCL-co-P(αN$_3$εCL) (1 equivalent αN$_3$εCL) and ammonium bromide (1.2 equivalent) were added into a round bottom flask containing 50/50 (v/v) THF/DMF mixture solvent. 0.1 equivalent of DBU and CuI were then added, and the reaction mixture was stirred at 35° C. for 4 h. After the reaction, the copolymer was precipitated in cold diethyl ether and dried in vacuo. Then the copolymers were dissolved in water and dialyzed against deionized water for several hours to remove the remaining small molecules. The final copolymers were recovered by freeze-drying, yielding block copolymer of ethylene glycol and quaternary ammonium-substituted caprolactone PEG-b-(PCL-co-P(CL-g-QA)).

Example 4

A salt-responsive degradable cationic graft copolymer containing polycaprolactone was prepared as shown in FIG. 3B. Two different monomers εCL and αClεCL with predetermined ratio (εCL/εCL=8:2) were used to produce macromonomers with different degree of polymerization. In a Schlenk flask N-[3-hydroxylpropyl]-cis-5-norbornene-exo-2,3-dicarboximide (NPH) initiator, caprolactone and chlorine substituted caprolactone were dissolved in dry toluene and the mixture was purged with nitrogen for 10 mins. Then the catalyst Sn(OCt)$_2$ was also dissolved in toluene and transferred into the Schlenk flask under nitrogen purging. Finally the reaction mixture was stirred at 110° C. under nitrogen for 24 h. The mixture was cooled to room temperature, diluted with toluene, precipitated twice from an excess of methanol, and dried overnight under reduced pressure to give the product NPH-g-(PCL-co-PCCL) macromonomer.

In a nitrogen-filled Schlenk tube, a solution of 3rd generation Grubbs catalyst in 2 mL of degassed toluene was added to a solution of macromonomer NPH-g-(PCL-co-PCCL) in 8 mL of toluene, which was degassed with three freeze-vacuum-thaw cycles. The molar ratio of macromonomer to catalyst was 10:1. After the reaction mixture was stirred for 4 h at 60° C., the polymerization was quenched by adding ethyl vinyl ether with stirring for 30 min. The solution was precipitated into an excess of methanol, and the precipitate was isolated by filtration and dried under vacuum for 24 h to give the polymer PNPH-g-(PCL-co-PCCL).

PNPH-g-(PCL-co-PCCL) (1 equivalent αClεCL) was dissolved in DMF in a round bottom flask with a stirring bar. Five equivalents of NaN$_3$ was then added and the mixture was stirred at room temperature overnight. After the reaction, the solid was filtered and the DMF was evaporated under reduced pressure. Then the mixture was dissolved in toluene and the insoluble solid was removed by centrifugation (5000 rpm at 25° C. for 15 min) Finally the copolymer was recovered by evaporation of the solvent in vacuo, yielding PNPH-g-(PCL-co-PN$_3$CL) graft copolymer.

The click reaction procedure was similar to the preparation of random copolymer PLA-co-P(CL-g-QA). PNPH-g-(PCL-co-P(αN$_3$εCL) (1 equivalent αN$_3$εCL) and ammonium bromide (1.2 equivalent) were added into a round bottom flask containing 50/50 (v/v) THF/DMF mixture solvent. 0.1 equivalent of DBU and CuI were then added, and the reaction mixture was stirred at 35° C. for 4 h. After the reaction, the copolymer was precipitated in cold diethyl ether and dry in vacuo. Then the copolymers were dissolved in water and dialyzed against deionized water for several hours to remove the remaining small molecules. The final copolymers were recovered by freeze-drying, yielding PNPH-g-(PCL-co-P(CL-g-QA)).

Example 5

Degradable stimuli-responsive random copolymers that exhibit high sensitivity to ionic strength (salt concentration)

are described. Cationic random copolymers, poly(s-caprolactone)-co-poly(ϵ-caprolactone-graft-quaternary ammonium) (PCL-co-P(CL-g-QA)), were synthesized by a combination of ring-opening polymerization and copper-catalyzed click chemistry. Random copolymers with various compositions of QA were prepared by adjusting the ratio of CL and substituted CL. Due to the presence of cationic QA groups at the polymer side chain, these random copolymers showed salt concentration (or ionic strength)-dependent solubility. In salt-free water or water with low ionic strength of salt (NaCl, $CaCl_2$), the random copolymers were soluble. While not wishing to be bound to any particular theory, this is believed to be due to the overwhelming domination of electrostatic repulsive Coulomb interactions between cationic QA species over attractive hydrophobic interactions between CL segments. The solubility of copolymers decreased with the increase of ionic strength of salt solution. While not wishing to be bound to any particular theory, this is believed to be due to the screening effect of free ions to reduce the repulsive Coulomb interactions between QA species and thus significant change of macromolecular conformations. It was found that the salt responsiveness of synthesized random copolymers was maximized when the CL-g-QA fraction was approximately 15 mol % in the copolymers. These random copolymers were readily degradable in diluted acidic conditions.

Materials.

Toluene and tetrahydrofuran (THF) were refluxed with sodium and distilled under a nitrogen atmosphere just before use. 2-Chlorocyclohexanone, m-chloroperoxybenzoic acid (mCPBA), Sn(II) 2-ethylhexanoate ($Sn(Oct)_2$), 4-tert-butylbenzyl alcohol, dichloromethane ($CH_2Cl_2$), N,N-dimethylformamide (DMF), methanol, diethyl ether, sodium azide, copper iodine, 1-bromoethane, 3-dimethylamion-1-propyne, and 1,8-diazabicyclo[5.4.0]undec-7-ene (DBU) were purchased from Sigma-Aldrich and used as received. ϵ-Caprolactone (ϵCL) was dried over calcium hydride and purified by vacuum distillation before polymerization. α-Chloro-ϵ-caprolactone (αClϵCL) was prepared according to a procedure reported earlier.

Characterizations.

$^1$H (300 MHz) NMR spectra were recorded on a Varian Mercury spectrometer with tetramethylsilane (TMS) as an internal reference. Fourier Transform Infrared Spectrometry (FTIR) spectra were recorded on a PerkinElmer spectrum 100 FTIR spectrometer. Gel Permeation Chromatography (GPC) was performed at 50° C. on a Varian system equipped with a Varian 356-LC refractive index detector and a Prostar 210 pump. The columns were STYRAGEL HR1, HR2 (300×7.5 mm) from Waters. HPLC grade DMF was used as eluent at a flow rate of 1 DMF and polymer solutions were filtered over microfilters with a pore size of 0.2 μm (Nylon, Millex-HN 13 mm Syringes Filters, Millipore, USA). The columns were calibrated against polystyrene standards. Optical turbidity (at 818 nm) of random copolymers in aqueous solution was measured using a UV-visible spectrophotometer (UV-2450, SHIMADZU) at room temperature. The samples were placed in 1 cm path length quartz cells, and de-ionized water was used as control.

Synthesis of Propargyl Quaternary Ammonium Salt

3-Dimethylamino-1-propyne (5.00 g, 60.1 mmol) was added in a round bottom flask containing 20 mL THF, followed by the addition of 1-bromoethane (7.90 g, 72.2 mmol). The reaction mixture was stirred at 35° C. for 2 days. Then the solvent and excess bromoethane were evaporated. The mixture was washed with diethyl ether three times to remove unreacted 3-dimethylamino-1-propyne. The quaternary ammonium salt was finally dried in vacuum. $^1$H NMR (methanol-$d_4$) δ: 4.35 (m, 2H, $CH_2N^+$); 3.55 (q, 2H, $N^+CH_2CH_3$); 3.30 (m, 1H, CH≡C); 3.15 (s, 6H, $N^+CH_3$); 1.40 (t, 3H, $N^+CH_2CH_3$).

Synthesis of Random Copolymer of ϵ-Caprolactone and α-Chloro-ϵ-Caprolactone (PCL-co-P(αClϵCL))

Various feed ratios of αClϵCL and ϵCL were used. A typical procedure is as follows. αClϵCL and ϵCL were dried by azeotropic distillation in toluene before polymerization. αClϵCL (0.59 g, 4.0 mmol), ϵCL (1.82 g, 16.0 mmol), and 4-tert-butylbenzyl alcohol (0.033 g, 0.2 mmol) were added into a Schlenk flask followed by the addition of 1.0 mL dry toluene. The flask was tightly sealed and purged with nitrogen for 10 min. Then $Sn(Oct)_2$ (0.008 g, 0.02 mmol) was added into the flask under nitrogen atmosphere. The reaction flask was placed into an oil bath preheated at 120° C. for 24 hours under continuous stirring. After the polymerization, the solution was diluted with dichloromethane and then precipitated in excess cold methanol. The final copolymer was recovered by centrifuge and dried at room temperature in a vacuum oven. The copolymer was characterized by $^1$H NMR and GPC. The conversion of monomers was nearly 100% according to $^1$H NMR analysis. $^1$H NMR ($CDCl_3$) δ: 4.3-4.21 (m, —CHClCO—); 4.21-4.13 (m, —$OCH_2$— in P(αClϵCL)); 4.12-4.0 (m, —$OCH_2$— in PCL); 2.40-2.20 (m, —$CH_2CO$—); 1.80-1.30 (broad, —$CH_2CH_2CH_2$—).

Synthesis of PCL-co-P(αN3ϵCL)

PCL-co-P(αClϵCL) (1.50 g, 2.3 mmol of αClϵCL) was dissolved in 10 mL dry DMF in a round bottom flask. $NaN_3$ (0.75 g, 11.5 mmol) was then added and the mixture was stirred at room temperature overnight. After the reaction, DMF was evaporated under reduced pressure and then 10 mL toluene was added. The insoluble salt was removed by centrifuge. Finally the copolymer was recovered by evaporation of the solvent. $^1$H NMR ($CDCl_3$) δ: 4.21-4.13 (m, —$OCH_2$— in P(αN$_3$ϵCL)); 4.12-4.0 (m, —$OCH_2$— in PCL); 3.85-3.78 (m, —$CHN_3CO$—); 2.40-2.20 (m, —$CH_2CO$—); 1.80-1.30 (broad, —$CH_2CH_2CH_2$—).

Synthesis of PCL-co-P(CL-g-QA) by Click Reaction

PCL-co-P(αN$_3$ϵCL) (1.00 g, 1.6 mmol of αN$_3$ϵCL), propargyl quaternary ammonium salt (0.35 g, 1.8 mmol), and CuI (0.031 g, 0.16 mmol) were dissolved in mixed DMF/THF (v/v: 50/50) in a Schlenk flask and purged with nitrogen for 10 min. DBU (0.025 g, 0.16 mmol) was dissolved in deoxygenated THF and transferred to the flask. The solution was stirred at 35° C. overnight. After the reaction, the mixture solution was diluted with THF and passed through a neutral aluminum oxide column to remove the copper catalyst and then precipitated in cold diethyl ether. The crude product was then dissolved in water and dialyzed against deionized water for 6 hours. The copolymer was finally recovered by freeze-drying. $^1$H NMR (DMSO-$d_6$) δ: 8.60 (s, CH═C, triazole); 5.70-5.45 (m, triazole-CH—CO); 4.75-4.70 (s, triazole-$CH_2$—$N^+$); 4.15-4.05 (m, —$OCH_2$— in triazole-containing unit); 4.05-3.95 (m, —$OCH_2$— in PCL); 3.05-2.95 (m, $N^+CH_3$); 2.40-2.20 (m, —$CH_2CO$—); 1.75-1.20 (m, —$CH_2CH_2CH_2$—, $N^+CH_2CH_3$).

Degradation of Random Copolymers.

Random copolymers were first dissolved in THF to give a polymer solution with 10 mg/mL concentration. Then 0.15 M $HCl_{(aq)}$ was added to the polymer solution and the mixture was stirred at room temperature overnight. Then the solvent was evaporated and degradation product was dried in vacuum.

TABLE 1

Molecular weight information of PCL-co-P(αCleCL), PCL-co-P(αN3eCL), and PCL-co-P(CL-g-QA).

| | | | PCL-co-P(αCleCL) | | | PCL-co-P(αN3eCL) | | PCL-co-P(CL-g-QA) | |
|---|---|---|---|---|---|---|---|---|---|
| Entry | $f_{\alpha CleCL}(\%)^a$ | $F_{\alpha CleCL}(\%)^b$ | $M_{n, NMR}$ (g/mol) | $M_{n, GPC}$ (g/mol) | $M_w/M_n$ (GPC) | $F_{\alpha N3eCL}(\%)^b$ | $M_{n, NMR}$ (g/mol) | $F_{QA}(\%)^b$ | $M_{n, NMR}$ (g/mol) |
| 1 | 10 | 8.9 | 11700 | 9400 | 1.41 | 9.4 | 11800 | 8.4 | 13400 |
| 2 | 15 | 15.3 | 11900 | 8900 | 1.32 | 13.7 | 12000 | 13.2 | 14500 |
| 3 | 20 | 19.2 | 12100 | 10800 | 1.37 | 19.6 | 12200 | 17.8 | 15500 |
| 4 | 30 | 28.2 | 12400 | 8500 | 1.35 | 28.1 | 12500 | 25.4 | 17300 |
| 5 | 50 | 47.6 | 13000 | 5400 | 1.53 | 45.5 | 13300 | 38.2 | 20300 |

$^a$molar composition of monomer feed ratio.
$^b$molar composition of copolymers determined by $^1$H NMR.

RESULTS

Preparation of Cationic Random Copolymers PCL-co-P(CL-g-QA)

Figure 4:
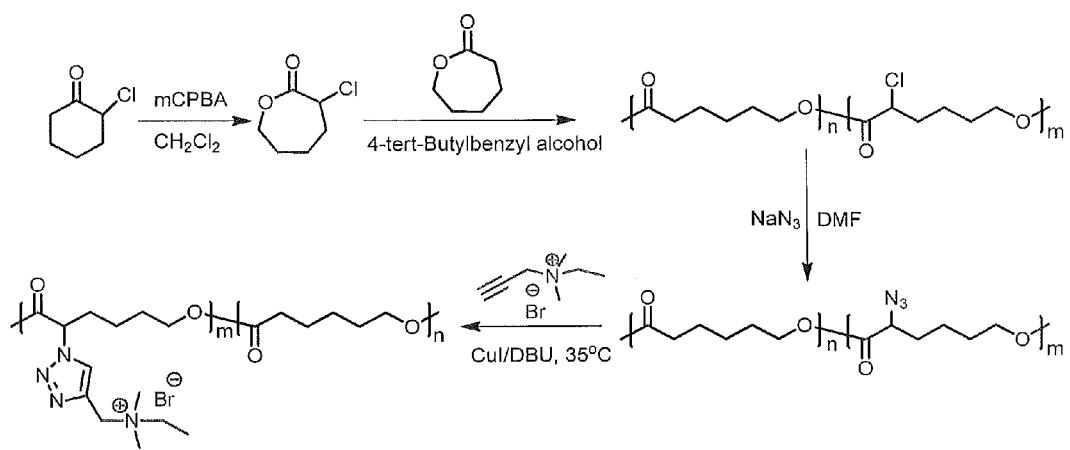
FIG. 4 shows a reaction scheme for preparing a random copolymer of caprolactone and quaternary ammonium substituted caprolactone according to embodiments of the invention.

"Click" type copper-catalyzed Huisgen-cycloaddition reaction was used to prepare cationic random copolymers by mixing two precursors, random copolymer PCL-co-P(αN$_3$eCL) and propargyl quaternary ammonium in the presence of DBU and CuI. The random copolymer of PCL and azide-substituted PCL was synthesized according to a multi-step process. As shown in FIG. 4, αCleCL monomer was prepared with the aid of α-chlorocyclohexanone and mCPBA via Baeyer-Villiger oxidation. Ring-opening polymerization of αCleCL and eCL was then carried out using Sn(Oct)$_2$ as catalyst and 4-tert-butylbenzyl alcohol as initiator, yielding PCL-co-P(αCleCL) copolymers. The chlorine group was further converted to azide group through a typical nucelophilic substitution reaction in the presence of sodium azide, yielding PCL-co-P(αN$_3$eCL) copolymers. A quaternization reaction between 3-dimethylamino-1-propyne and bromoethane under a mild condition was carried out to prepare propargyl quaternary ammonium. Five copolymers with 10, 15, 20, 30 and 50 mol % of PCL-g-QA unit were prepared. Table 1 summarized the results of the random copolymers of PCL-co-P(αCleCL), PCL-co-P(αN$_3$eCL), and PCL-co-P(CL-g-QA). The molecular weights (M$_n$) and molar compositions (F$_{\alpha CleCL}$ (%), F$_{\alpha N3eCL}$ (%), and F$_{QA}$(%)) of the random copolymers were calculated by $^1$H NMR analysis. For the PCL-co-P(αCleCL), the $^1$H NMR spectrum showed two characteristic peaks at 4.2 and 2.3 ppm, which corresponded to the protons next to the carbonyl groups in P(αCleCL) and PCL units respectively. The molar compositions of the copolymers were determined by comparing the integration values of these two peaks. For the random copolymer PCL-co-P(αN$_3$eCL), the molar compositions were determined by comparing the peaks at 3.8 and 2.3 ppm, which were assigned to the protons next to azide group in P(αN$_3$eCL) and next to carbonyl group in PCL respectively. As for the final cationic copolymers, the molar compositions can be calculated from triazole peak at 8.6 ppm and peak at 2.3 ppm for proton adjacent to carbonyl group in PCL unit. The molecular weight of these random copolymers can be calculated from the initial monomer to initiator ratio and monomer conversion, which was obtained from NMR analysis.

The molecular weight of the random copolymers was also characterized by GPC. Both the chlorine-substituted and azide-substituted PCL had monomodal symmetric distribution with reasonably low PDI, indicating that the ring-opening polymerization was controlled.

Figure 5:
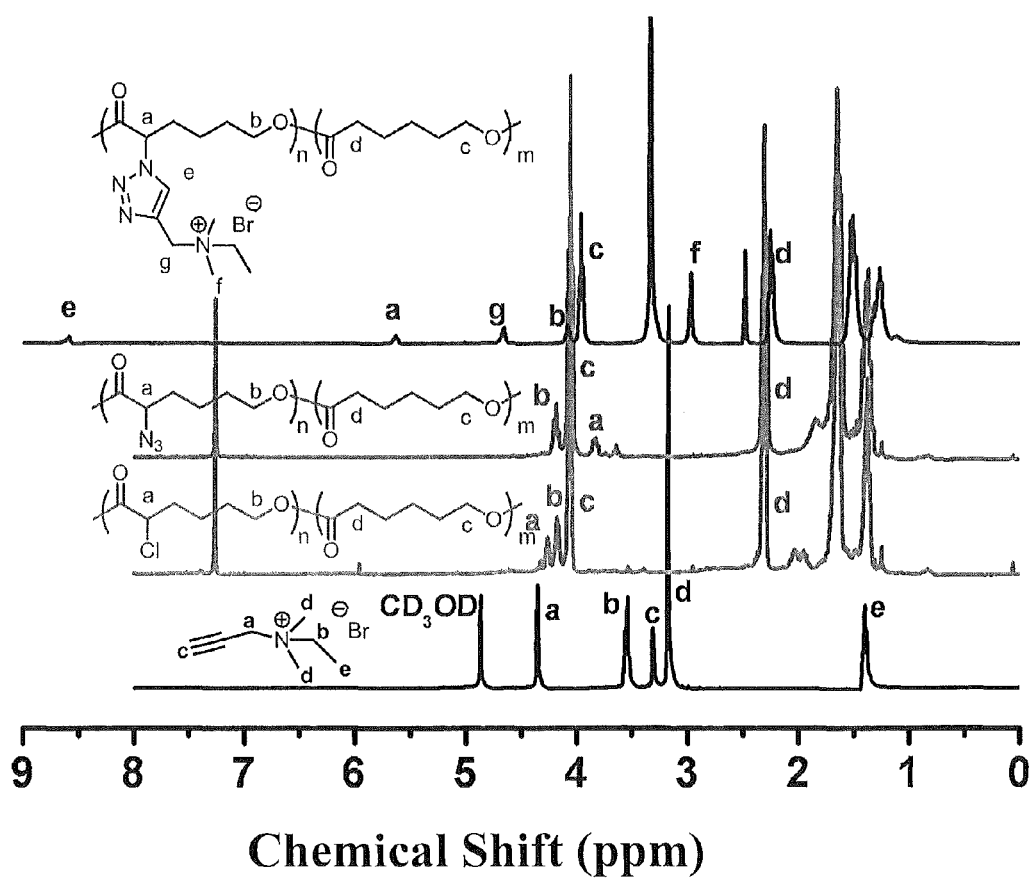
FIG. 5 shows a $^1$H NMR spectra of PCL-co-P($\alpha$Cl$\epsilon$CL), PCL-co-P($\alpha$N$_3\epsilon$CL), and PCL-co-PCCL-g-QA) copolymers (15 mol % of $\alpha$Cl$\epsilon$CL) according to embodiments of the invention.
Figure 6:
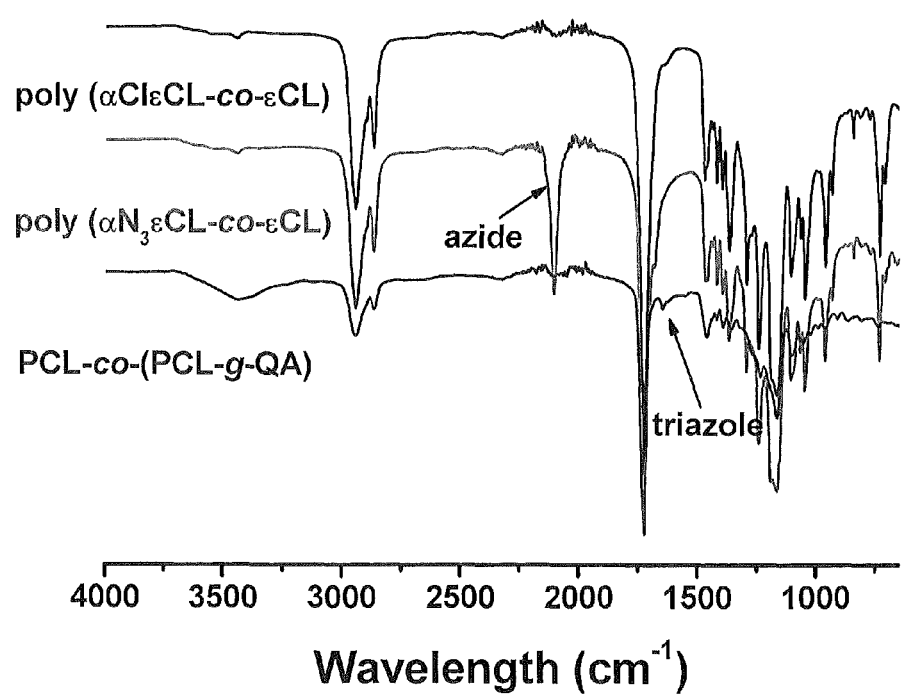
FIG. 6 shows a FT-IR spectra of PCL-co-P($\alpha$Cl$\epsilon$CL), PCL-co-P($\alpha$N$_3\epsilon$CL), and PCL-co-P(CL-g-QA) copolymers (15 mol % of $\alpha$Cl$\epsilon$CL) according to embodiments of the invention.

Chemical structures of the random copolymers, PCL-co-P(αCleCL), PCL-co-P(αN$_3$eCL), and PCL-co-(PCL-g-QA), were characterized by both $^1$H NMR and FT-IR. After converting the chlorine group to azide group, the peak at 4.25 ppm for the CHCl proton shifted to 3.8 ppm, corresponding to the CHN$_3$ proton (FIG. 5). Integration of the NMR spectra indicated the 100% conversion of the chlorine groups. The chlorine to azide conversion was also confirmed by FT-IR. FIG. 6 shows that a sharp absorption peak at 2100 cm$^{-1}$ emerged, corresponding to the characteristic absorption of azide group. After the click reaction, the peak at 3.8 ppm in NMR spectra disappeared completely and a new peak at about 8.6 ppm corresponded to the proton from the triazole group. A new peak at 3.0 ppm was assigned to the methyl groups next to the triazole group. FT-IR spectra also showed that the peak at 2100 cm$^{-1}$ disappeared completely after click reaction, indicating the complete reaction of azide group. A new absorption at 1660 cm$^{-1}$, arose, which originated from the traizole absorption.

Salt-Responsive Property of PCL-co-P(CL-g-QA)

Salt-responsive property of the random copolymers was characterized. The copolymers were first dissolved in salt-free water to produce aqueous solutions with 1 wt % concentration. Then a series of copolymer solutions with different salt concentrations were prepared by adding varying amount of inorganic salt (NaCl) into the solutions.

PCL-co-P(CL-g-QA) with 15% mol P(CL-g-QA) was well dissolved in salt-free water to form a transparent solution. With the increase of NaCl concentration in solutions, the solution turned light milky and turbid. When the ionic strength of NaCl solution reached 0.6 M, the solution formed opaque suspension with some precipitates observed at the bottom of vials. 20 mol % P(CL-g-QA)-containing copolymers showed similar behaviors. However, for the copolymer with more quaternary ammonium substituted PCL (i.e. approximately 30 mol %), the solution initially showed slightly milky. However, further increase of ionic strength of NaCl solution up to 1.0M did not result in suspension-like solution. Copolymers with higher than 30 mol % P(CL-g-QA) were too hydrophilic to show any salt-responsive property. It should be pointed out that the random copolymer with 10 mol % P(CL-g-QA) (sample 1 in Table 1) did not dissolve well in salt-free water, probably due to the high fraction of hydrophobic PCL.

Figure 7:
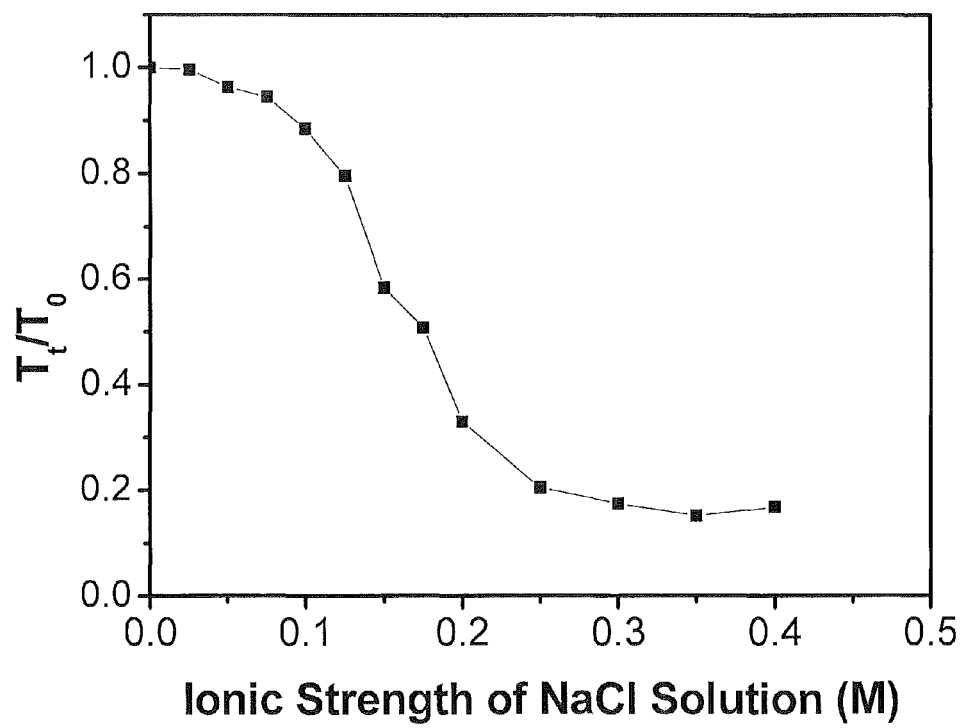
FIGS. 7A-C show graphs plotting the solution transmittance ratio ($T_r/T_0$) (at 818 nm) versus the ionic strength of NaCl solutions containing (A) PCL-co-P(CL-g-QA) with 15 mol % P(CL-g-QA); (B) PCL-co-P(CL-g-QA) with 20 mol % P(CL-g-QA); and (C) PCL-co-P(CL-g-QA) with 30 mol % P(CL-g-QA) according to embodiments of the invention.
Figure 7:
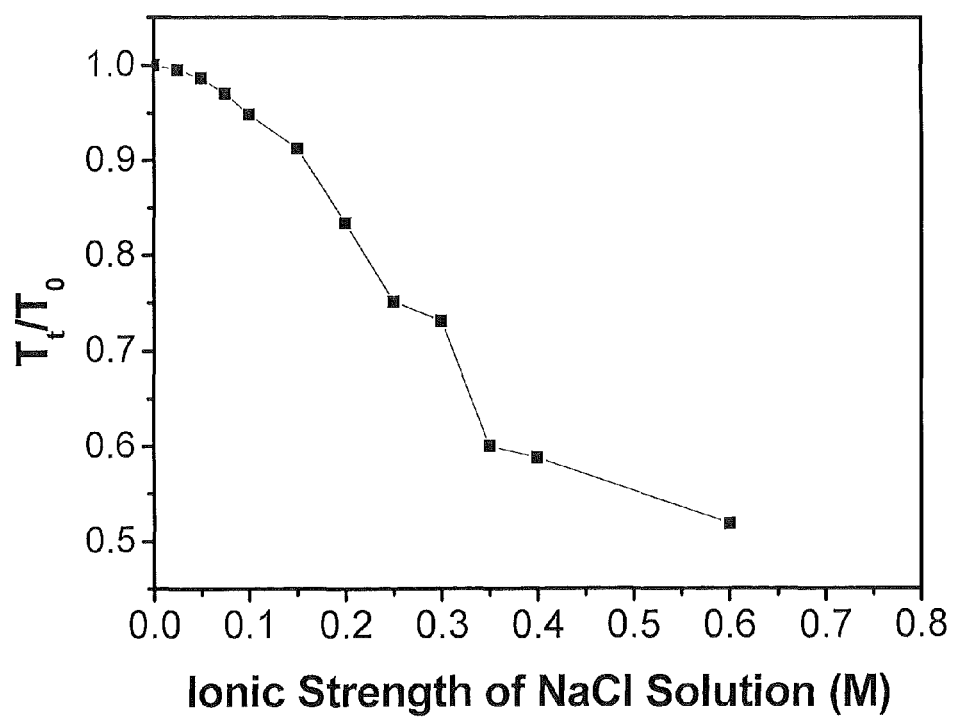
Figure 7:
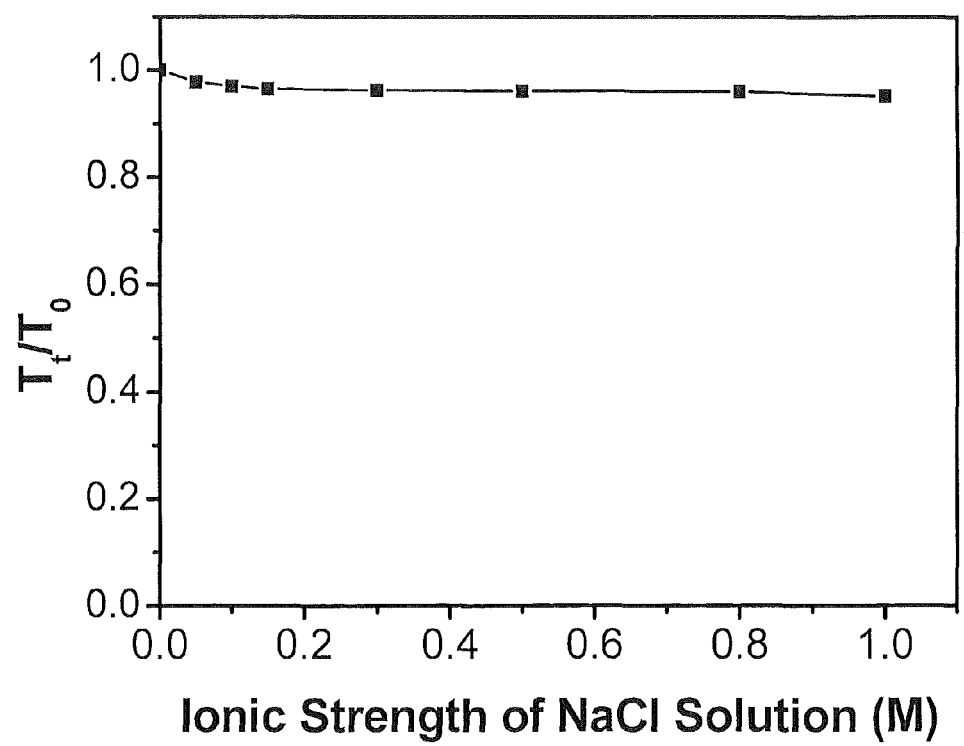

The optical turbidity (at 818 nm) of PCL-co-P(CL-g-QA) copolymers was then measured by a UV-Visible spectrophotometer at room temperature. The transmittance of the solutions (T$_t$) was tested and compared with that of pure deionized water ($T_0$), as shown by solution transmittance ratio ($T_t/T_0$) as a function of NaCl concentration in FIGS. 7A-C. For the copolymer with 15 mol % P(CL-g-QA) (FIG. 7A), the transmittance ratio showed significant decrease at approximately 0.1M of ionic strength of NaCl solution, which corresponded to the formation of slightly turbid solution. The sharpest decrease of the transmittance ratio (approximately 0.6) was observed in the range of 0.1M-0.2M of the ionic strength of NaCl solution. The $T_t/T_0$ value dropped to 0.2 at the ionic strength of NaCl solution equal to 0.4M, corresponding to the opaque suspension solution. For the copolymer with 20 mol % P(CL-g-QA), the transmittance ratio showed similar transition behavior, although with much slower decrease on the change of concentration. The decrease of the transmittance ratio by about 0.45 was required the change of the ionic strength of NaCl solution from 0.1M to 0.6M. For the copolymer with 30 mol % P(CL-g-QA), the transmittance ratio showed a slight decrease when the ionic strength of NaCl solution increased up to 0.2M. Further increasing the ionic strength did not lead to the decrease of transmittance ratio, indicating this copolymer composition did not have appreciable salt-responsive property.

Figure 8:
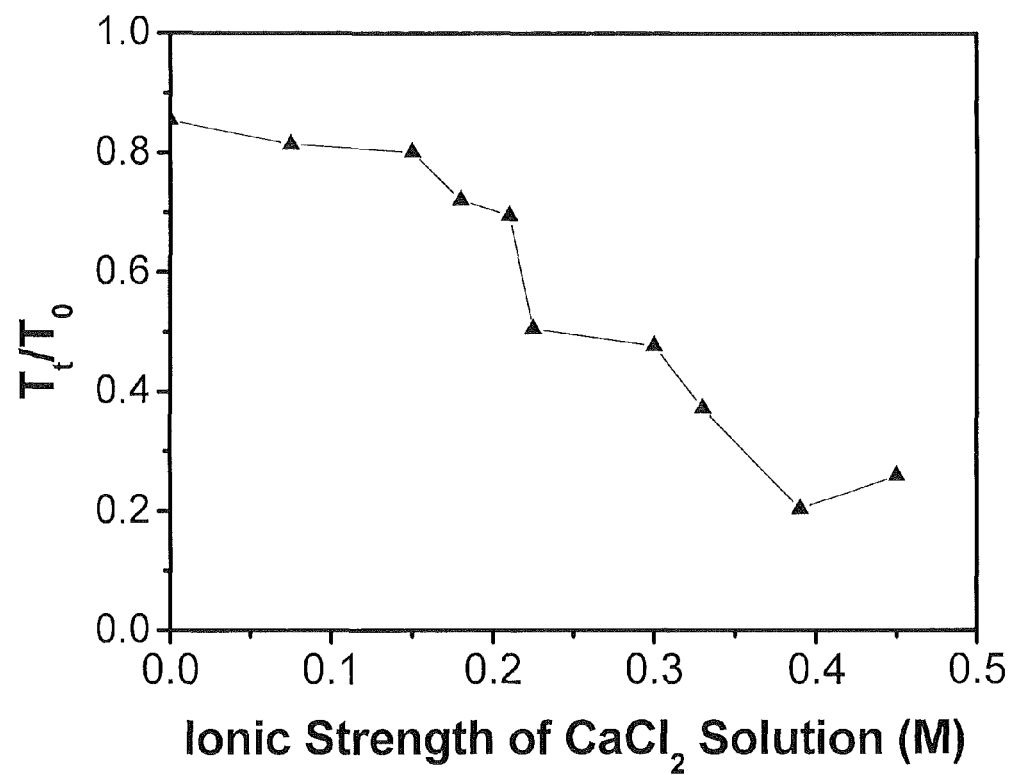
FIG. 8 shows a graph plotting the solution transmittance ratio ($T_r/T_0$) (at 818 nm) versus the ionic strength of CaCl$_2$ solutions containing PCL-co-P(CL-g-QA) (15 mol % of P(CL-g-QA)) according to embodiments of the invention.

To compare different salt effects on the polymer solubility, divalent $CaCl_2$ was used to determine the salt-responsive property of PCL-co-P(CL-g-QA) copolymers. Compared with NaCl solution, $CaCl_2$ solution showed similar sensitivity to the copolymers, with the formation of turbid solution at ionic strength as low as 0.15M, indicating a strong "screening" effect of $CaCl_2$ to the cationic polymer chains. UV-Visible tests further confirmed high salt-responsive property of copolymers in the presence of $CaCl_2$. FIG. 8 shows the transmittance ratio profiles of PCL-co-P(CL-g-QA) containing 15 mol % P(CL-g-QA). The largest decrease (0.6) of transmittance ratio of the polymer solution was in the range of 0.15M and 0.4M of ionic strength. With the ionic strength of $CaCl_2$ at 0.45M, most polymers precipitated.

Thick films (approximately 50 to 300 μm thick) of PCL-co-P(CL-g-QA) copolymers with 15 mol % of P(CL-g-QA) were prepared and tested solubility against water with different salt concentration. In the salt-free water, the entire film first cracked into many small pieces and became completely soluble and transparent within hours. However, in a NaCl solution with ionic strength at 0.15M, the film well maintained its shape even after a few days, indicating its hydrophobic nature in salted water.

In salt-free water or diluted solution with low ionic strength, the random copolymers were well dissolved. While not wishing to be bound to any particular theory, this is believed to be due to fully solvated charged groups on the coil surface and electrostatic repulsive Coulomb interactions between cationic quaternary ammonium charges keep copolymer chains from coagulating with each other. With the addition of salt (NaCl or $CaCl_2$) into the aqueous solution of copolymers, it is believed that the ionic screening effect will be intensified by the free ions in water to reduce the above electrostatic repulsive Coulomb interactions between quaternary ammonium charges (the electric field lines between quaternary ammonium charges are terminated in the presence of many free ions). The copolymers gradually become insoluble with the increase of ionic strength, resulting in the increase of turbidity of the solution observed. While not wishing to be bound to any particular theory, these results suggest that the free-ion screening effect may play a major role in the solubility of polymers only when there is an optimal composition range of quaternary ammonium moiety in the copolymers, mostly due to the balance of hydrophilic and hydrophobic components in the copolymer chain.

Degradability of PCL-co-P(CL-g-QA)

The degradability of cationic random copolymers was tested by an acid-catalyzed degradation method. 10 mg/mL polymer solution (1.0 mL) was added with 0.15M HCl (0.2 mL) to give a final solution with 0.025M HCl and 8.3 mg/mL random copolymers. After the degradation in acidic condition, the GPC traces showed that the degraded species shifted to a much lower molecular weight in the range of monomeric units, indicating the preservation of excellent PCL degradability, even after the incorporation of quaternary ammonium groups.

The degradable salt-responsive cationic random copolymers PCL-co-P(CL-g-QA) were prepared by combining ROP and a click reaction. While not wishing to be bound to any particular theory, it is believed that the high efficiency of the click reaction allowed for manipulation of the compositions of salt-responsive groups in the cationic copolymers. The turbidity and solubility tests indicated that PCL-co-P(CL-g-QA) with 15 mol % PCL-g-QA showed the best salt responsive property. This class of degradable cationic random copolymers may find potential applications in biomedical fields and personal care products.

Example 6

A class of cationic bottle-brush polymers that show ionic strength dependent stimuli-responsiveness were prepared. Brush polymers with norbornene as backbone and quaternary ammonium (QA)-containing polycaprolactone copolymers as side chains were synthesized by a combination of ring-opening metathesis polymerization (ROMP), ring-opening polymerization (ROP) and click reaction. Brush polymers containing 20 mol % cationic QA groups showed excellent salt responsive property in aqueous solution, as confirmed by both UV-Vis and atomic force microscopy measurements. In deionized (DI) water or water with low ionic strength, brush polymers were conformationally stretched and soluble. While not wishing to be bound to any particular theory, this is believed to be due to the strong electrostatic repulsion between cationic QA groups. As the addition of salt to increase ionic strength, single brush polymers underwent a transition from extended conformation to collapsed state and finally became insoluble in solution. While not wishing to be bound to any particular theory, this is believed to be due to the screening effect of salts that yielded the once-dominant electrostatic interactions among QA species to hydrophobic-hydrophobic interactions.

Synthesis of Cationic Caprolactone Molecular Brushes

As shown in FIGS. 3A and 3B, cationic molecular brushes were synthesized by a combination of ROMP, ROP and click reaction. A macromonomer was first prepared by ROP of ε-caprolactone (εCL) and α-chloro-ε-caprolactone (αClεCL) using N-[3-hydroxylpropyl]-cis-5-norbornene-exo-2,3-dicarboximide (NPH) as initiator. The macromonomer was then polymerized via ROMP using Grubbs III catalyst followed by the conversion of chlorine groups to azide groups. Finally a copper-catalyzed cycloaddition reaction was employed to give cationic brushes PNPH-g-(PCL-co-P(CL-g-QA)). Compared with the synthesis of other salt-responsive polymer brushes, our approach to prepare PNPH-g-(PCL-co-P(CL-g-QA)) brushes has some advantages. First, ROMP has high tolerance to functional groups and allows high reaction conversion without inducing chain crosslinking. Second, the high efficient click reaction can ensure the synthesis of molecular brushes with controlled molar fractions of salt-responsive cationic groups.

Macromonomer Synthesis

Macromonomers NPH-g-[PCL-co-P(αClεCL)] were prepared by ROP of εCL and αClεCL with various molar feed ratios using Sn(Oct)$_2$ and NPH as catalyst and initiator, respectively. ROP was controlled with conversion <95% to minimize transesterification. The macromonomer structures were characterized by $^1$H NMR. The peak at 6.25 ppm corresponded to the vinyl protons at the norbornene. The peak for the proton adjacent to the chlorine group was located at 4.25 ppm. Peaks at 4.14 ppm and 4.05 ppm represented the protons adjacent to oxygen in αClεCL and CL units, respectively. The proton next to the ester group in CL units gave a peak at 2.30 ppm. The molecular weights of macromonomers were determined by comparing the integration areas of the protons in the αClεCL and CL units.

"Graft-through" of Macromonomer by ROMP

"Graft-through" polymerization of NPH-g-[PCL-co-P(αClεCL)] macromonomer was performed via ROMP with the aid of Grubbs III catalysts. The macromonomer was employed to run ROMP with different ratios of [macromonomer]/[catalyst]. All polymerizations had very high monomer conversions (approximately 100%). PNPH-g-[PCL-co-P(αClεCL)] brushes with high molecular weight and relatively narrow molecular weight distribution were achieved. Absolute molecular weight was estimated with the assumption of approximately 100% conversion. $^1$H NMR spectra of polymer brushes showed that the signals of vinyl protons on the norbornene at 6.25 ppm disappeared and a new flat peak at 5.75 ppm appeared, indicating that the macromonomers were polymerized via ROMP. Compared with the protons in the macromonomers, the other protons did not show significant changes in their chemical shifts, suggesting that ROMP did not affect molecular structures of PCL-co-P(αClεCL) side chains. The molecular weight of polymer brushes showed a clear shift towards higher molecular weights in GPC traces compared to that of macromonomer. Although hydrodynamic behavior of polymer brushes is significantly different from that of macromonomer or polystyrene (calibration standard), such dramatic difference in GPC traces still suggested the successful polymerization of the macromonomer.

Installation of QA Groups by Click Chemistry

The chloro-substituted group in polymer brush PNPH-g-[PCL-co-P(αClεCL)] was further converted to azide group by reacting with NaN$_3$ in DMF at room temperature. Resultant PNPH-g-[PCL-co-P(αN$_3$εCL)] was characterized by both $^1$H NMR and FT-IR. According to the $^1$H NMR spectra, a new peak at 3.80 ppm in the PNPH-g-[PCL-co-P(αN$_3$εCL)] appeared, representing the proton next to the azide group, while the previous peak at 4.25 ppm (proton next to chlorine) completely disappeared, indicating that all chlorine groups were replaced by azide groups. The FT-IR spectra of polymer brushes showed a strong characteristic absorption at 2100 cm$^{-1}$, corresponding to the azide groups in the side chains of polymer brushes. Furthermore, the GPC traces of polymer brushes PNPH-g-[PCL-co-P(αN$_3$εCL)] showed similar molecular weight to that of PNPH-g-[PCL-co-P(αClεCL)], indicating that the PCL side chains of polymer brushes didn't degrade during the reaction.

QA groups were finally installed onto molecular brushes by a click reaction between azide-containing PNPH-g-[PCL-co-P(αN$_3$εCL)] and alkyne-containing QA ethyl dimethyl propargyl quaternary ammonium bromide (EDPQA) with the aid of catalyst CuI and ligand 1,8-diazabicycloundec-7-ene (DBU), yielding the final cationic molecular brushes PNPH-g-[PCL-co-P(CL-g-QA)]. According to the $^1$H NMR spectra, a new chemical shift at 8.65 ppm was assigned to the proton from the newly formed triazole group. The peak at 3.80 ppm disappeared and a new peak at 5.70 ppm was assigned to the proton (on the caprolactone unit) next to the triazole group, indicating that nearly all azide groups in polymer brushes reacted with alkyne to form triazole during the click reaction. FT-IR spectra further confirmed the high efficiency of click reaction, as the azide absorption at 2100 cm$^{-1}$ disappeared completely after reaction. It should be mentioned that GPC was not used to characterize the molecular weight of cationic polymer brushes PNPH-g-[PCL-co-P(CL-g-QA)], due to possible interactions between ionic groups and GPC columns.

Salt Response of Bottle-Brush Polymers

The salt-responsive property of molecular brushes PNPH-g-[PCL-co-P(CL-g-QA)] was characterized with the aid of UV-Vis spectroscopy and AFM. The brushes were dissolved in DI water with a concentration of 1 mg/mL (or 0.1 wt %). Then a series of copolymer solutions with different salt concentrations were prepared by adding NaCl into the solutions. PNPH-g-[PCL-co-P(CL-g-QA)] molecular brush with 20 mol % QA groups was well dissolved in salt-free water to produce a transparent aqueous solution. With the increase of NaCl concentration, the polymer brush solutions turned increasingly turbid. When the ionic strength of NaCl solution was between 0.15M and 0.3M, the solution changed from slightly unclear and turbid to milky. As the ionic strength of NaCl solution reached 0.4 M or higher, the solution formed an opaque suspension with some precipitation at the bottom of vials. It is worthy to mention that due to the sufficiently high molecular weight, this molecular brush can produce nice films, which are important for applications in personal-care products. The salt response of molecular brushes with different fraction of QA groups was tested. Brushes with less charged groups (e.g. 15 mol % QA) had limited solubility in DI water. For the brush with more ionic groups (30 mol % QA), brush solutions were transparent and did not show much change with the increase of ionic strength.

Figure 9:
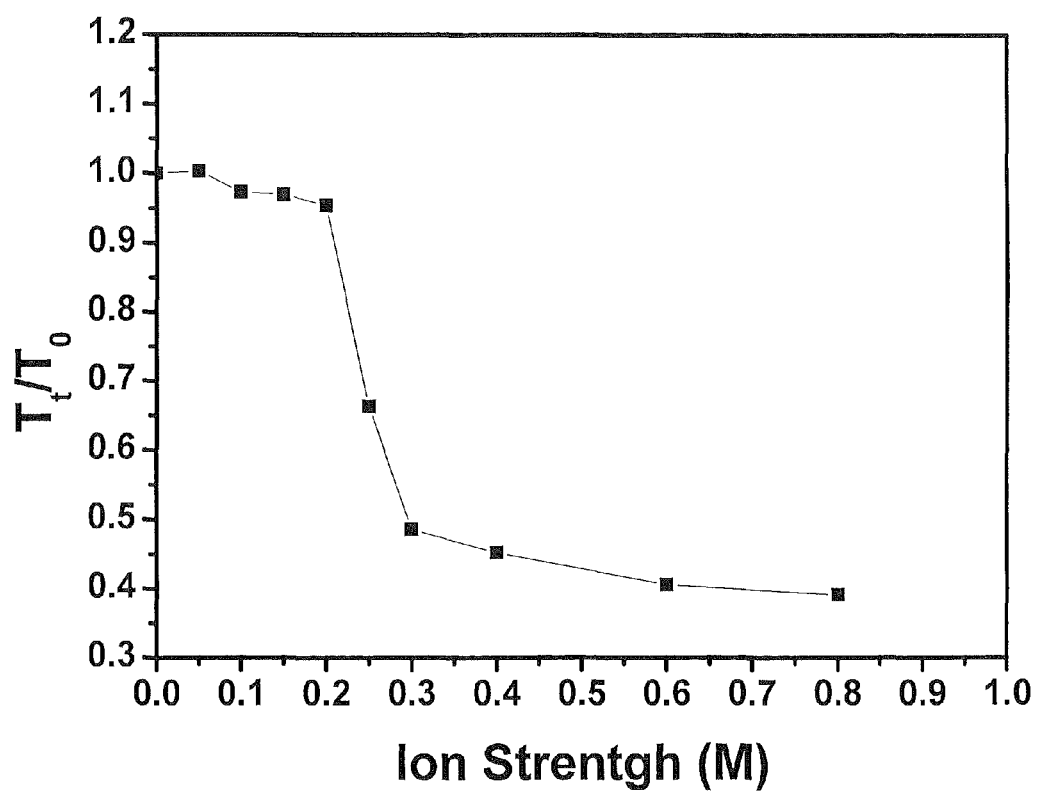
FIG. 9 shows a graph plotting the solution transmittance ratio ($T_r/T_0$) (at 800 nm) versus the ionic strength of NaCl solutions containing the molecular brush PNPH-g-[PCL-co-P(CL-g-QA)] with 20 mol % QA groups solutions according to embodiments of the invention.

The optical turbidity (at 800 nm) of PNPH-g-[PCL-co-P(CL-g-QA)] brushes was then measured by a UV-Visible spectrophotometer at room temperature. The transmittance of the solutions ($T_t$) was tested and compared with that of DI water ($T_0$), as shown by solution transmittance ratio ($T_t/T_0$) as a function of ionic strength of salt solution in FIG. 9. The transmittance ratio showed an obvious sharp decrease when the ionic strength of NaCl solution was more than 0.2 M, which corresponded to the formation of slightly turbid solution. When the ionic strength of NaCl solution reached higher than 0.4M, the $T_t/T_0$ value dropped to less than 0.45, corresponding to the opaque suspension solution.

Figure 10:
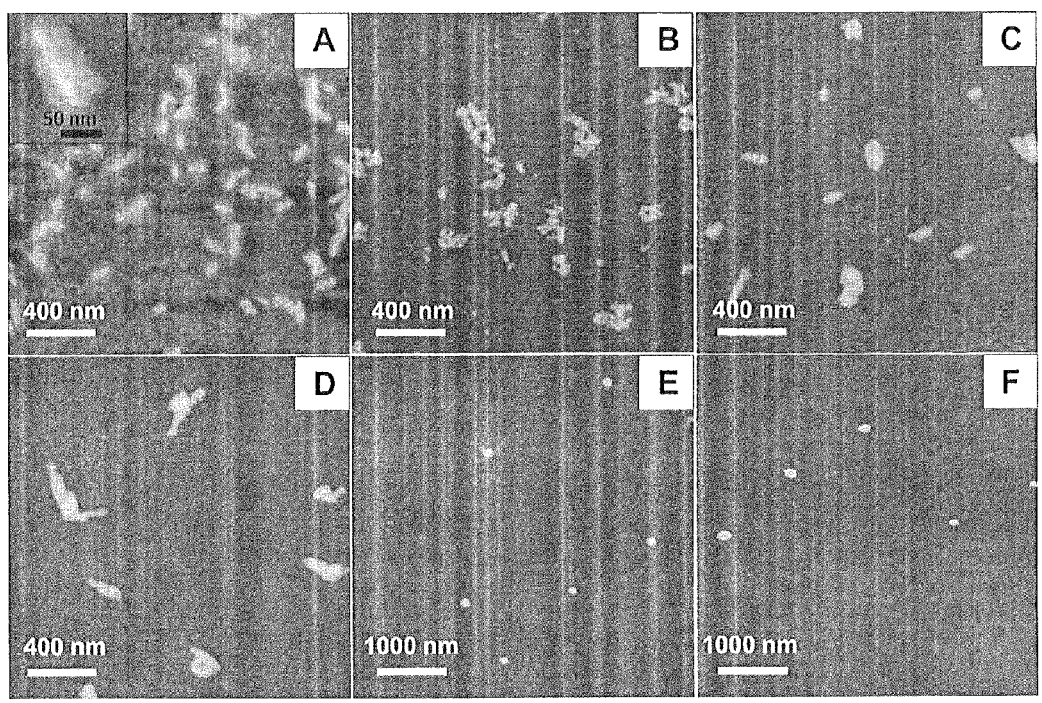
FIGS. 10A-F show atomic force microscopy (AFM) images of the molecular brush PNPH-g-[PCL-co-P(CL-g-QA)] with 20 mol % QA groups in aqueous solutions having the following ionic strengths: (A) 0 M, (B) 0.05 M, (C) 0.1 M, (D) 0.2 M, (E) 0.3 M, and (F) 0.4 M according to embodiments of the invention.

To further confirm the salt responsive property of molecular brushes PNPH-g-[PCL-co-P(CL-g-QA)] with 20 mol % QA groups, AFM was used to image the morphologies of molecular brushes (FIGS. 10A-10F), First, polymer brush solutions with 0.1 mg/mL concentration were prepared, and then NaCl was added to tune the final solutions with different salt concentrations. As shown in FIG. 10A, the polymer brushes from DI water solution showed typical extended worm-like morphology, since these brushes are completely soluble in water due to the electrostatic repulsion between QA groups. The average length of single polymer brushes was around 100 nm±30 nm. Zoomed AFM image (inset in FIG. 10A) clearly showed the presence of halo around the backbone, corresponding to the extended side chains of polymer brushes. While not wishing to be bound to any particular theory, in salt-free water or diluted solution with low ionic strength, the extended conformation of molecular brushes is believed to be due to the overwhelming domination of electrostatic repulsive Coulomb interactions between cationic QA species over attractive hydrophobic-hydrophobic interactions between PCL segments. When salt was introduced into the polymer solution with a concentration of 0.05M, the polymer brushes started to shrink and curve inward, while the persistent length became much shorter (FIG. 10B). In addition, the halo from side chains was not observable. When the salt concentration increased to 0.1-0.2M, a collapsed rod-like or sphere-like morphology was observed (FIGS. 10C and 10D). Completely collapsed polymer brushes were observed when the salt concentration was ≥0.3M (FIGS. 10E and 10F). With the addition of salt into the aqueous solution of copolymers, the ionic screening effect will be intensified by the free ions in water to reduce the above electrostatic repulsive Coulomb interactions between QA charges (the electric field lines between QA charges are terminated in the presence of many free ions). The polymer brushes gradually became insoluble with the increase of ionic strength, resulting in the increase of turbidity of the solution observed. While not wishing to be bound to any particular theory, these results suggest that the free-ion screening effect can play a major role in the solubility of molecular brushes only when there is an optimal composition range of QA groups in the brushes, mostly due to the balance of hydrophilic and hydrophobic components in the brush chain. All of these observations from AFM further confirmed the salt responsiveness results by UV-Vis spectroscopy.

The successful synthesis of cationic PNPH-g-[PCL-co-P(CL-g-QA)] molecular brushes using a "grafting-through" ROMP strategy coupled with ROP and click reaction was demonstrated. The versatility of ROMP and high efficiency of click reaction allowed for a high molecular weight brushes with narrow molecular weight distribution and controlled fractions of cationic groups to be obtained. Solution test, UV-Vis and AFM analysis showed that these cationic molecular brushes exhibited excellent responsiveness to the ionic strength in aqueous solutions. While not wishing to be bound to any particular theory, this believed to be due to that the compositions of hydrophobic and hydrophilic components are balanced.

Materials.

Toluene and tetrahydrofuran (THF) were refluxed with sodium and distilled under a nitrogen atmosphere just before use. Grubbs III catalyst was synthesized. ε-Caprolactone was dried over calcium hydride and purified by vacuum distillation before polymerization. α-Chloro-ε-caprolactone (αClεCL) was prepared according to our early work. All other chemicals were purchased from Sigma-Aldrich and used as received.

Characterization.

$^1$H (300 MHz) NMR spectra were recorded on a Varian Mercury spectrometer with tetramethylsilane (TMS) as an internal reference. Fourier Transform Infrared Spectrometry (FTIR) spectra were recorded on a PerkinElmer spectrum 100 FTIR spectrometer. Mass spectra were conducted on a Waters Micromass Q-T of mass spectrometer. The ionization source is positive ion electrospray. Gel Permeation Chromatography (GPC) was performed in DMF at a flow rate of 1.0 mL/min at 50° C. on a Varian system equipped with a Varian 356-LC refractive index detector and a Prostar 210 pump. The columns were STYRAGEL HR1, HR2 (300×7.5 mm) from Waters. DMF and polymer solutions were filtered over microfilters with a pore size of 0.2 μm (Nylon, Millex-HN 13 mm Syringes Filters, Millipore, USA). The columns were calibrated against polystyrene standards. Optical turbidity (at 818 nm) of random copolymers in aqueous solution was measured using a UV-visible spectrophotometer (UV-2450, SHIMADZU) at room temperature. The samples were placed in 1 cm path length quartz cells, and de-ionized water was used as control. Atomic force microscopy (AFM) measurements were performed on a Nanoscope V Multimode instrument, using tapping mode. Polymer brush solution in water was drop-cast onto fresh-cleaved mica substrates and visualized by AFM after dryness.

Synthesis of N-[3-hydroxylpropyl]-cis-5-norbornene-exo-2,3-dicarboximide (NPH)

NPH was prepared as described in Sheiko et al., *Prog. Polym. Sci.* 2008, 33, 759. Briefly, Cis-5-norbornene-exo-2,3-dicarboxylic anhydride (NDA) (1.0 g, 6.0 mmol) was dissolved in 20 mL dichloromethane (DCM) and 3-amino-1-propanol (0.50 g, 6.7 mmol) was added dropwise to the DCM solution under stirring. Then the solvent was evaporated and the mixture was heated at 110° C. overnight. Finally the mixture was passed through an alumina column to give the product NPH. $^1$H NMR (CDCl$_3$) δ: 6.27 (s, 2H, CH=CH), 3.64 (t, 2H, NCH$_2$CH$_2$), 3.53 (CH$_2$CH$_2$OH), 3.26 (s, 2H, CHCON), 2.71 (m, 2H, CH$_2$CH), 1.77 (m, 2H, CH$_2$CH$_2$CH$_2$), 1.23, 1.54 (m, 2H, CH$_2$CH). $^{13}$C NMR (CDCl$_3$) δ: 178.6 (CON), 137.6 (CH=CH), 58.9 (CH$_2$OH), 47.7 (CH$_2$CHCHCO), 45.0 (CH$_2$CHCHCO), 42.6 (CH$_2$CHCHCO), 34.9 (NCH$_2$CH$_2$), 30.4 (NCH$_2$CH$_2$). MS (ESI, m/z): theoretical 221.25. found 221.

Synthesis of Ethyl Dimethyl Propargyl Quaternary Ammonium Bromide (EDPQA)

3-Dimethylamino-1-propyne (5.00 g, 60.1 mmol) was added in a round bottom flask containing 20 mL THF, followed by the addition of 1-bromoethane (7.90 g, 72.2 mmol). The reaction mixture was stirred at 35° C. for 2 days. Then the solvent and excess bromoethane were evaporated. The mixture was washed with diethyl ether three times to remove unreacted 3-dimethylamino-1-propyne. The quaternary ammonium bromide was finally dried in vacuum. $^1$H NMR (CD$_4$O) δ: 4.35 (m, 2H, CH$_2$N$^+$); 3.55 (q, 2H, N$^+$CH$_2$CH$_3$); 3.30 (m, 1H, CH≡C); 3.15 (s, 6H, N$^+$CH$_3$); 1.40 (t, 3H, N$^+$CH$_2$CH$_3$). $^{13}$C NMR (CD$_4$O) δ: 82.7 (CH≡C), 72.3 (CH≡C), 60.9 (N$^+$CH$_2$CH$_3$), 54.5 (CH$_2$N$^+$), 50.5 (N$^+$CH$_3$), 8.6 (N$^+$CH$_2$CH$_3$). MS (ESI, m/z): theoretical 192.10. found 112 (without Br$^-$ anion).

Synthesis of NPH-PCL-co-P(αClεCL) Macromonomer by ROP

NPH—PCL-co-P(αClεCL) macromonomers with different degree of polymerization (DP) were prepared by ROP. As an example, εCL (0.91 g, 8.0 mmol) and αClεCL (0.30 g, 2.0 mmol) were dissolved in 1 mL dry toluene and added into a Schlenk flask along with NPH initiator (0.044 g, 0.2 mmol). The mixture was purged with nitrogen for 10 min. Sn(OCt)$_2$ (0.008 g, 0.02 mmol) was dissolved in 0.2 mL dry toluene and transferred into the Schlenk flask under the protection of nitrogen. Finally the reaction mixture was stirred at 110° C. under nitrogen for 24 h. After reaction, the mixture was cooled to room temperature, diluted with toluene, precipitated twice into cold methanol, and dried overnight under vacuum to constant weight.

Synthesis of PNPH-g-[PCL-co-P(αClεCL)] Molecular Brushes by ROMP

As an example, in a nitrogen-filled reaction flask, macromonomer NPH-g-[PCL-co-P(αClεCL)] (400 mg, 61.5

μmol) was dissolved in 5 mL dry toluene. The flask was tightly sealed and purged with nitrogen for 15 min. Then a solution of Grubbs III catalyst (0.9 mg, 1.23 μmol) in 2 mL of degassed toluene was added to the flask under the protection of nitrogen. The mixture was stirred at 60° C. for 4 h and the polymerization was quenched by the addition of 1 mL ethyl vinyl ether. The solution was stirred for another 30 min and then precipitated in excess methanol. The polymer was isolated by filtration and dried under vacuum to constant weight.

Synthesis of PNPH-g-[PCL-co-P($\alpha N_3$CL)] Molecular Brushes

PNPH-g-[PCL-co-P($\alpha$Cl$\epsilon$CL)] (0.4 g, 0.65 mmol $\alpha$Cl$\epsilon$CL) was dissolved in DMF in a round bottom flask with a stirring bar. NaN$_3$ (0.21 g, 3.25 mmol) was then added and the mixture was stirred at room temperature overnight. After the reaction, the solid was filtered and the DMF was evaporated under reduced pressure. Then the mixture was dissolved in toluene and the insoluble solid was removed by centrifugation (5000 rpm at 25° C. for 15 min). Finally the copolymer was recovered by evaporation of the solvent under reduced pressure.

Synthesis of PNPH-g-[PCL-co-P(CL-g-QA)] Molecular Brushes by Click Reaction

PNPH-g-[PCL-co-P($\alpha N_3 \epsilon$CL)] (0.22 g, 0.36 mmol $\alpha N_3 \epsilon$CL) and EDPQA (0.076 g, 0.40 mmol) were added into a round bottom flask containing DMF and the mixture was purged with nitrogen for 10 min. DBU (0.0055 g, 0.036 mmol) and CuI (0.0068 g, 0.036 mmol) were then added, and the reaction mixture was stirred at 35° C. for 4 h. After the reaction, the copolymer was precipitated in cold diethyl ether and dried in vacuum. The filtered solid was then dissolved in water and dialyzed against deionized water for 6 h to remove the remaining small molecules and other impurities. The final copolymers were recovered by freeze-drying.

Degradation of PNPH-g-[PCL-co-P(CL-g-QA)] Molecular Brushes 10 mg Molecular brush PNPH-g-[PCL-co-P(CL-g-QA)] (20 mol % QA) was dissolved in 1 mL THF to give a 10 mg/mL solution. Then 0.2 mL HCl$_{(aq)}$ (0.3M) was added to the solution and the mixture was stirred at room temperature overnight. The solvent was evaporated under reduced pressure and the degradation residue was dried under vacuum.

Film Preparation of PNPH-g-[PCL-co-P(CL-g-QA)] Molecular Brushes

Polymer brush (3.0 g) was well dissolved in methylene chloride (6 mL) to give a polymer solution. The solution was drop-cast onto a clean glass substrate and the film was dried in air overnight. The film was then dried under vacuum to remove any residual solvent.
Degradability of Molecular Brushes.

The degradability of cationic polymer brush PNPH-g-[PCL-co-P(CL-g-QA)] was tested under acidic condition (aq. HCl). The acid and polymer concentrations were at 0.05M and 8.3 mg/mL respectively. After the degradation in acid solution, GPC was employed to measure the molecular weight of degraded products. Since the final cationic polymer brush PNPH-g-[PCL-co-P(CL-g-QA)] was difficult to characterize by GPC, due to the strong interaction between polyelectrolytes and GPC column, the molecular weight of degraded products was compared with that of PNPH-g-[PCL-co-P($\alpha$Cl$\epsilon$CL)] polymer brush. The GPC traces showed that after degradation, the high molecular weight peak completely disappeared and a very lower molecular weight peak appeared, indicating the excellent degradability of molecular brushes.

The foregoing is illustrative of the present invention, and is not to be construed as limiting thereof. The invention is defined by the following claims, with equivalents of the claims to be included therein. All publications, patent applications, patents, patent publications, and other references cited herein are incorporated by reference in their entireties.

That which is claimed is:

1. A degradable stimuli-responsive polymer, wherein the polymer is responsive to ionic strength.

2. The polymer of claim 1, wherein the polymer solubilizes in the presence of a salt concentration of less than about 0.05 M.

3. The polymer of claim 1, wherein the polymer is substantially insoluble in an aqueous salt solution having a salt concentration of 0.05 M or greater.

4. The polymer of claim 1, wherein the polymer is a cationic polymer.

5. The polymer of claim 1, wherein the polymer is a block copolymer, random copolymer, star copolymer, graft copolymer, a bottle-brush polymer, and any combination thereof.

6. The polymer of claim 1, wherein the polymer comprises a polyester segment.

7. The polymer of claim 1, wherein the polymer comprises at least one unit selected from the group consisting of caprolactone, lactide, lactic acid, glycolic acid, hydroxyalkanoic acid, hydroxybutyric acid, hydroxyvaleric acid, trimethylene carbonate, dicarboxylic acid anhydrides, butylene succinate, butylene adipate, abietic acid, levopimaric acid, hydroabietic acid, pimaric acid, norbornene, derivatives thereof, and any combination thereof.

8. The polymer of claim 1, wherein the polymer comprises at least one charged moiety selected from the group consisting of a quaternary ammonium moiety, a pyridinium moiety, a phosphonium moiety, derivatives thereof, and any combination thereof.

9. The polymer of claim 1, wherein the polymer has a molecular weight in a range of about 5,000 g/mole to about 5,000,000 g/mole.

10. The polymer of claim 1, wherein the polymer comprises a first degradable unit and a second degradable unit, the second degradable unit comprising a charged moiety.

11. The polymer of claim 1, wherein the polymer comprises a charged moiety and the charged moiety is present in the polymer in a range of about 5 mol % to about 40 mol %.

12. The polymer of claim 1, wherein the polymer comprises at least one degradable unit comprising a caprolactone moiety and a quaternary ammonium moiety.

13. A method for preparing a stimuli-responsive copolymer comprising:
co-polymerizing at least two monomers using a ring-opening polymerization to form a copolymer; and
attaching a charged moiety to the copolymer using a coupling reaction, thereby preparing the stimuli-responsive copolymer.

14. The method of claim 13, wherein the coupling reaction is a click chemistry reaction, an esterification reaction, an imidization reaction, and any combination thereof.

15. The method of claim 13, wherein the charged moiety is selected from the group consisting of a quaternary ammonium moiety, a pyridinium moiety, a phosphonium moiety, and any combination thereof.

16. The method of claim 13, further comprising polymerizing the copolymer using a ring-opening polymerization or a step-growth polymerization.

17. The method of claim 13, wherein the copolymer is responsive to ionic strength.

18. The method of claim 13, wherein the copolymer solubilizes in the presence of a salt concentration of less than about 0.05 M.

19. A fibrous article comprising the degradable stimuli-responsive polymer of claim 1.

20. A drug delivery device comprising the degradable stimuli-responsive polymer of claim 1.

* * * * *

UNITED STATES PATENT AND TRADEMARK OFFICE
CERTIFICATE OF CORRECTION

PATENT NO.      : 8,809,466 B2                                    Page 1 of 1
APPLICATION NO. : 13/930001
DATED           : August 19, 2014
INVENTOR(S)     : Tang et al.

It is certified that error appears in the above-identified patent and that said Letters Patent is hereby corrected as shown below:

In the Specification,
Column 3, Line 48: Please correct "+10%," to read -- ± 10%, --

Column 15, Line 45: Please correct "Monomers ECL" to read -- Monomers εCL --

Signed and Sealed this
Thirtieth Day of December, 2014

Michelle K. Lee
*Deputy Director of the United States Patent and Trademark Office*